(12) United States Patent
Zhou et al.

(10) Patent No.: US 11,444,740 B2
(45) Date of Patent: Sep. 13, 2022

(54) EVENT-TRIGGERED REFERENCE SIGNAL TRANSMISSION FOR CARRIER SELECTION

(71) Applicant: QUALCOMM Incorporated, San Diego, CA (US)

(72) Inventors: Yan Zhou, San Diego, CA (US); Tao Luo, San Diego, CA (US); Sony Akkarakaran, Poway, CA (US); Hamed Pezeshki, San Diego, CA (US); Konstantinos Dimou, San Francisco, CA (US); Jing Sun, San Diego, CA (US); Kazuki Takeda, Yokosuka (JP); Mostafa Khoshnevisan, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/920,160

(22) Filed: Jul. 2, 2020

(65) Prior Publication Data
US 2021/0014017 A1    Jan. 14, 2021

Related U.S. Application Data

(60) Provisional application No. 62/872,032, filed on Jul. 9, 2019.

(51) Int. Cl.
*H04L 5/00* (2006.01)
*H04W 28/04* (2009.01)

(52) U.S. Cl.
CPC ............ *H04L 5/006* (2013.01); *H04L 5/0007* (2013.01); *H04L 5/0044* (2013.01); *H04L 5/0048* (2013.01); *H04W 28/04* (2013.01)

(58) Field of Classification Search
CPC ..... H04L 5/006; H04L 5/0007; H04L 5/0044; H04L 5/0048; H04L 5/0094;
(Continued)

(56) References Cited

U.S. PATENT DOCUMENTS

2018/0091262 A1    3/2018  Jung et al.
2019/0190582 A1*   6/2019  Guo ................... H04W 72/046
(Continued)

FOREIGN PATENT DOCUMENTS

WO    WO-2005078976 A1    8/2005

OTHER PUBLICATIONS

Ericsson: "Further Discussions on FR1-FR2 Inter-Band CA MRTD Requirements", 3GPP Draft, 3GPP TSG-RAN WG4 Meeting NR AH #1802, R4-1808969, Further Discussions on FR1-FR2 REV03. 3rd Generation Partnership Project (3GPP), Mobile Competence Centre, 650, Route Des Lucioles, F-06921 Sophia-Antipolis Cedex, France, vol. RAN WG1, No. Montreal, Canada, Jul. 2, 2018-Jul. 6, 2018, Jul. 11, 2018 (Jul. 11, 2018), XP051583206, 5 pages, Retrieved from the Internet: URL: http://www.3gpp.org/ftp/tsg%5Fran/WG4% 5FRadio/TSGR4%5FAHs/TSGR4%5FAH%2D1807/Docs/R4% 2D1808969%2Ezip. [retrieved on Jul. 11, 2018] section 3.1.
(Continued)

*Primary Examiner* — Sharmin Chowdhury
(74) *Attorney, Agent, or Firm* — Harrity & Harrity, LLP

(57) ABSTRACT

Various aspects of the present disclosure generally relate to wireless communication. In some aspects, a base station may receive, from a user equipment (UE), a message that indicates whether the UE received a downlink transmission from the base station in a first frequency range. The base station may schedule one or more reference signal (RS) transmissions in the first frequency range and one or more RS transmissions in a second frequency range based at least in part on the message received from the UE, and reschedule
(Continued)

the downlink transmission on a component carrier in either the first frequency range or the second frequency range based at least in part on channel quality information that is determined from the one or more RS transmissions in the first frequency range and the one or more RS transmissions in the second frequency range. Numerous other aspects are provided.

30 Claims, 15 Drawing Sheets

(58) Field of Classification Search
CPC ..... H04L 1/1864; H04L 5/001; H04L 5/0057; H04L 1/0026; H04W 28/04
See application file for complete search history.

(56) References Cited

U.S. PATENT DOCUMENTS

| | | | | |
|---|---|---|---|---|
| 2020/0045684 | A1* | 2/2020 | Futaki | H04W 16/28 |
| 2020/0228268 | A1* | 7/2020 | Cao | H04L 5/0023 |
| 2020/0244337 | A1* | 7/2020 | Yuan | H04W 76/27 |
| 2020/0245156 | A1* | 7/2020 | Takano | H04W 16/28 |
| 2021/0160126 | A1* | 5/2021 | Cirik | H04L 41/0677 |
| 2021/0385826 | A1* | 12/2021 | Moon | H04L 1/00 |

OTHER PUBLICATIONS

International Search Report and Written Opinion—PCT/US2020/040799—ISA/EPO—dated Oct. 13, 2020.

Qualcomm Incorporated: "CSI Enhancement for IOT and URLLC", 3GPP Draft, 3GPP TSG RAN WG1 #102-e, R1-2006800, 3rd Generation Partnership Project (3GPP), Mobile Competence Centre, 650, Route Des Lucioles, F-06921 Sophia-Antipolis Cedex, France, vol. RAN WG1, No. E-Meeting, Aug. 17, 2020-Aug. 28, 2020, Aug. 8, 2020 (Aug. 8, 2020), XP051918250, 4 pages, Retrieved from the Internet: URL: https://ftp.3gpp.org/tsg_ran/WG1_RL1/TSGR1_102-e/Docs/R1-2006800.zip R1-2006800, CSI Enhancement for IOT and URLLC.docx. [retrieved on Aug. 8, 2020] section 4.

Qualcomm Incorporated: "Summary for Potential Enhancements to Scheduling/HARQ/CSI Processing Timeline", 3GPP Draft, 3GPP TSG-RAN WG1 Meeting #96, R1-1903804, Summary, 7.2.6.1.4 Enhancements to Scheduling/HARQ/CSI Processing Timeline, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Mar. 3, 2019 (Mar. 3, 2019), XP051691050, 52 pages, Retrieved from the Internet: URL: http://www.3gpp.org/ftp/tsg%5Fran/WG1%5FRL1/TSGR1%5F96/Docs/R1%2D1903804%2Ezip. [retrieved on Mar. 3, 2019] section 3.3.2.

* cited by examiner

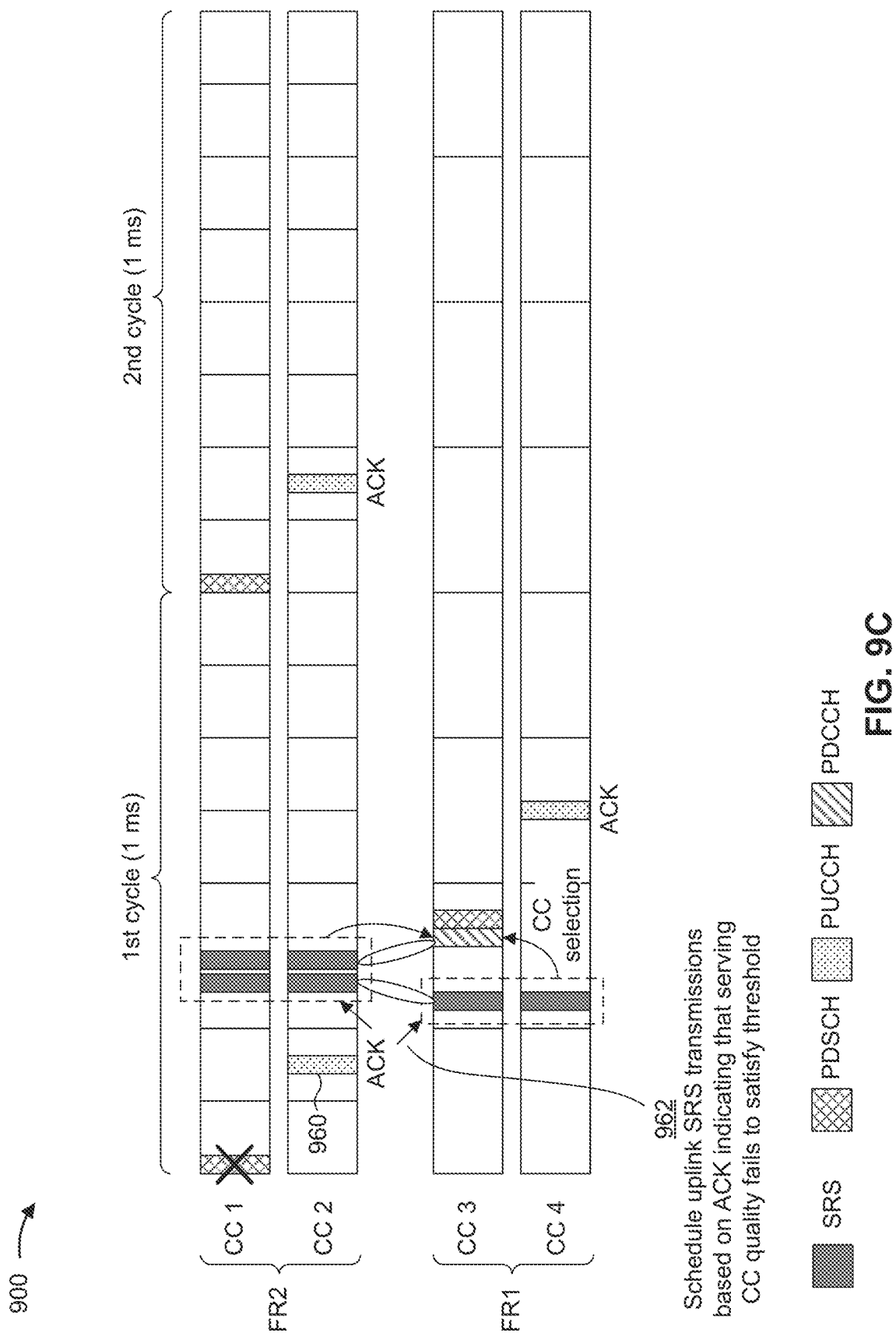

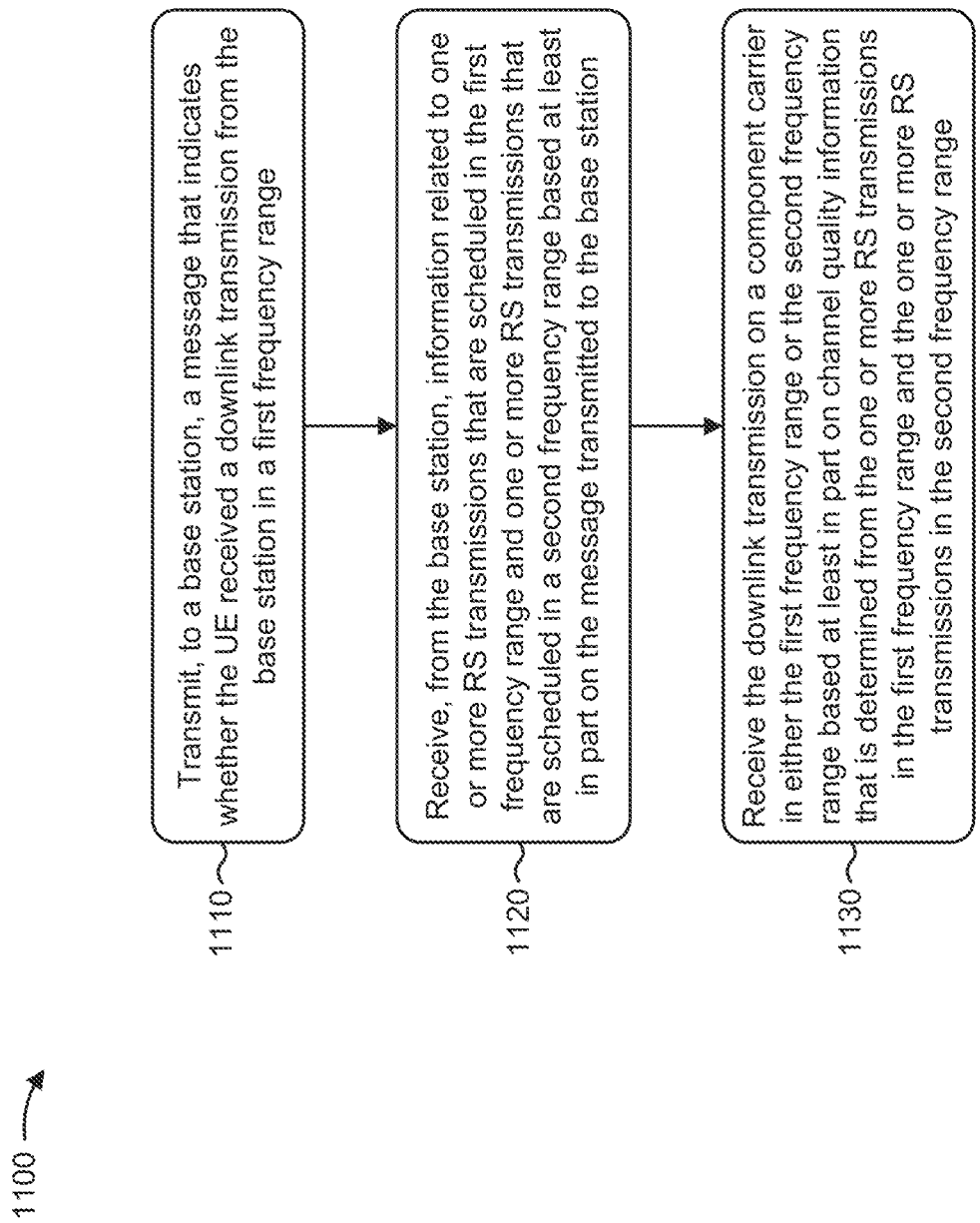

EVENT-TRIGGERED REFERENCE SIGNAL TRANSMISSION FOR CARRIER SELECTION

CROSS-REFERENCE TO RELATED APPLICATION

This patent application claims priority to U.S. Provisional Patent Application No. 62/872,032, filed on Jul. 9, 2019, entitled "EVENT-TRIGGERED REFERENCE SIGNAL TRANSMISSION FOR CARRIER SELECTION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for event-triggered reference signal transmission for carrier selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a base station, may include receiving, from a user equipment (UE), a message that indicates whether the UE received a downlink transmission from the base station in a first frequency range; scheduling one or more reference signal (RS) transmissions in the first frequency range and one or more RS transmissions in a second frequency range based at least in part on the message received from the UE; and rescheduling the downlink transmission on a component carrier in either the first frequency range or the second frequency range based at least in part on channel quality information that is determined from the one or more RS transmissions in the first frequency range and the one or more RS transmissions in the second frequency range.

In some aspects, a method of wireless communication, performed by a UE, may include transmitting, to a base station, a message that indicates whether the UE received a downlink transmission from the base station in a first frequency range; receiving, from the base station, information related to one or more RS transmissions that are scheduled in the first frequency range and one or more RS transmissions that are scheduled in a second frequency range based at least in part on the message transmitted to the base station; and receiving the downlink transmission on a component carrier in either the first frequency range or the second frequency range based at least in part on channel quality information that is determined from the one or more RS transmissions in the first frequency range and the one or more RS transmissions in the second frequency range.

In some aspects, a base station may include a memory and one or more processors operatively coupled to the memory. The memory and the one or more processors may be configured to: receive, from a UE, a message that indicates whether the UE received a downlink transmission from the base station in a first frequency range; schedule one or more RS transmissions in the first frequency range and one or more RS transmissions in a second frequency range based at least in part on the message received from the UE; and reschedule the downlink transmission on a component carrier in either the first frequency range or the second frequency range based at least in part on channel quality information that is determined from the one or more RS transmissions in the first frequency range and the one or more RS transmissions in the second frequency range.

In some aspects, a UE may include a memory and one or more processors operatively coupled to the memory. The memory and the one or more processors may be configured to: transmit, to a base station, a message that indicates whether the UE received a downlink transmission from the base station in a first frequency range; receive, from the base station, information related to one or more RS transmissions that are scheduled in the first frequency range and one or more RS transmissions that are scheduled in a second frequency range based at least in part on the message transmitted to the base station; and receive the downlink transmission on a component carrier in either the first frequency range or the second frequency range based at least in part on channel quality information that is determined from the one or more RS transmissions in the first frequency range and the one or more RS transmissions in the second frequency range.

In some aspects, a non-transitory computer-readable medium may store one or more instructions for wireless communication. The one or more instructions, when executed by one or more processors of a base station, may cause the one or more processors to: receive, from a UE, a message that indicates whether the UE received a downlink transmission from the base station in a first frequency range; schedule one or more RS transmissions in the first frequency range and one or more RS transmissions in a second frequency range based at least in part on the message received from the UE; and reschedule the downlink transmission on a component carrier in either the first frequency range or the second frequency range based at least in part on channel quality information that is determined from the one or more RS transmissions in the first frequency range and the one or more RS transmissions in the second frequency range.

In some aspects, a non-transitory computer-readable medium may store one or more instructions for wireless communication. The one or more instructions, when executed by one or more processors of a UE, may cause the one or more processors to: transmit, to a base station, a message that indicates whether the UE received a downlink transmission from the base station in a first frequency range; receive, from the base station, information related to one or more RS transmissions that are scheduled in the first frequency range and one or more RS transmissions that are scheduled in a second frequency range based at least in part on the message transmitted to the base station; and receive the downlink transmission on a component carrier in either the first frequency range or the second frequency range based at least in part on channel quality information that is determined from the one or more RS transmissions in the first frequency range and the one or more RS transmissions in the second frequency range.

In some aspects, an apparatus for wireless communication may include means for receiving, from a UE, a message that indicates whether the UE received a downlink transmission from the apparatus in a first frequency range; means for scheduling one or more RS transmissions in the first frequency range and one or more RS transmissions in a second frequency range based at least in part on the message received from the UE; and means for rescheduling the downlink transmission on a component carrier in either the first frequency range or the second frequency range based at least in part on channel quality information that is determined from the one or more RS transmissions in the first frequency range and the one or more RS transmissions in the second frequency range.

In some aspects, an apparatus for wireless communication may include means for transmitting, to a base station, a message that indicates whether the apparatus received a downlink transmission from the base station in a first frequency range; means for receiving, from the base station, information related to one or more RS transmissions that are scheduled in the first frequency range and one or more RS transmissions that are scheduled in a second frequency range based at least in part on the message transmitted to the base station; and means for receiving the downlink transmission on a component carrier in either the first frequency range or the second frequency range based at least in part on channel quality information that is determined from the one or more RS transmissions in the first frequency range and the one or more RS transmissions in the second frequency range.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9A-9D are diagrams illustrating examples of event-triggered reference signal transmissions on serving and non-serving component carriers to enable cross-carrier retransmission, in accordance with various aspects of the present disclosure.

FIG. 11 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
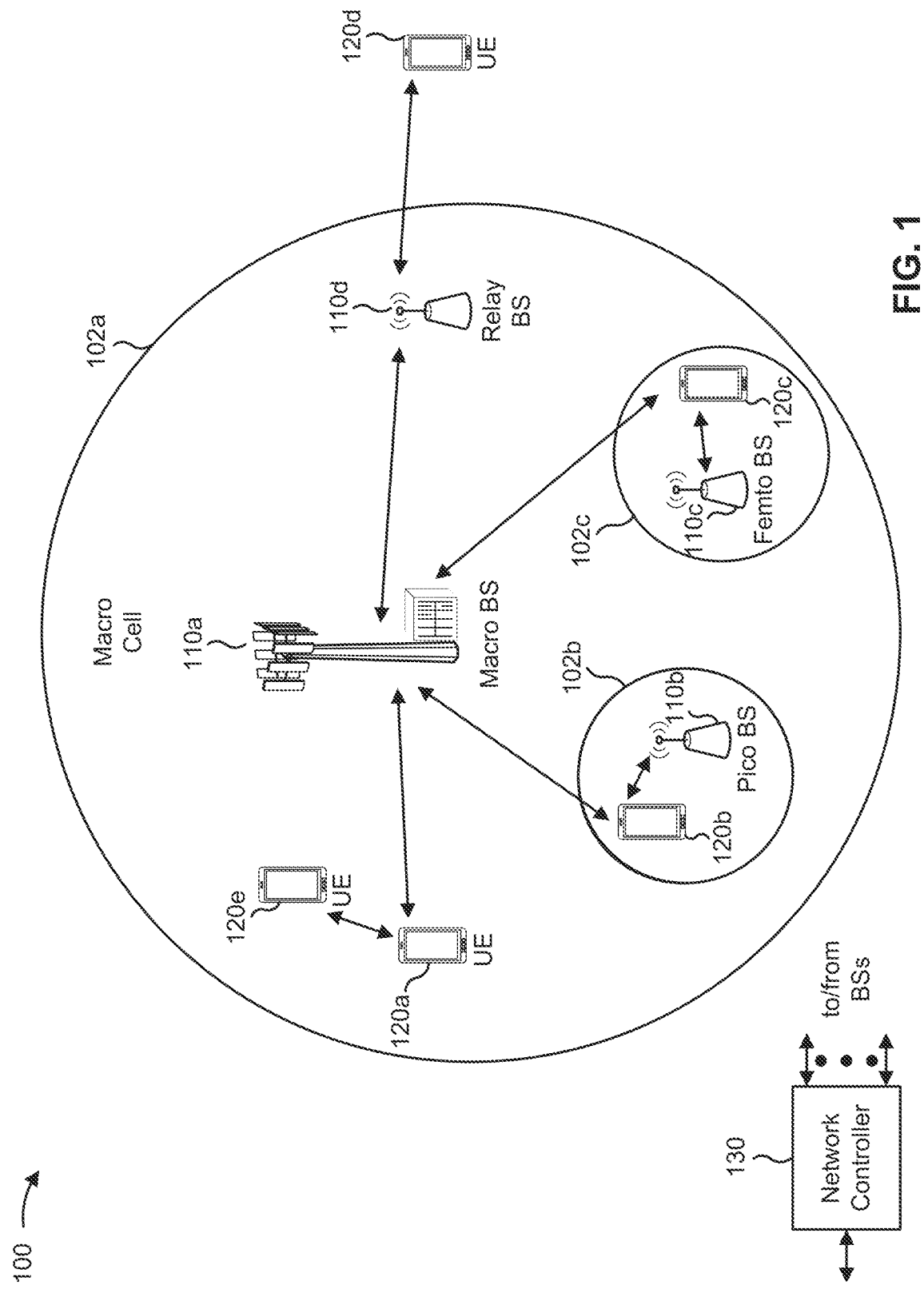
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may be coupled to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
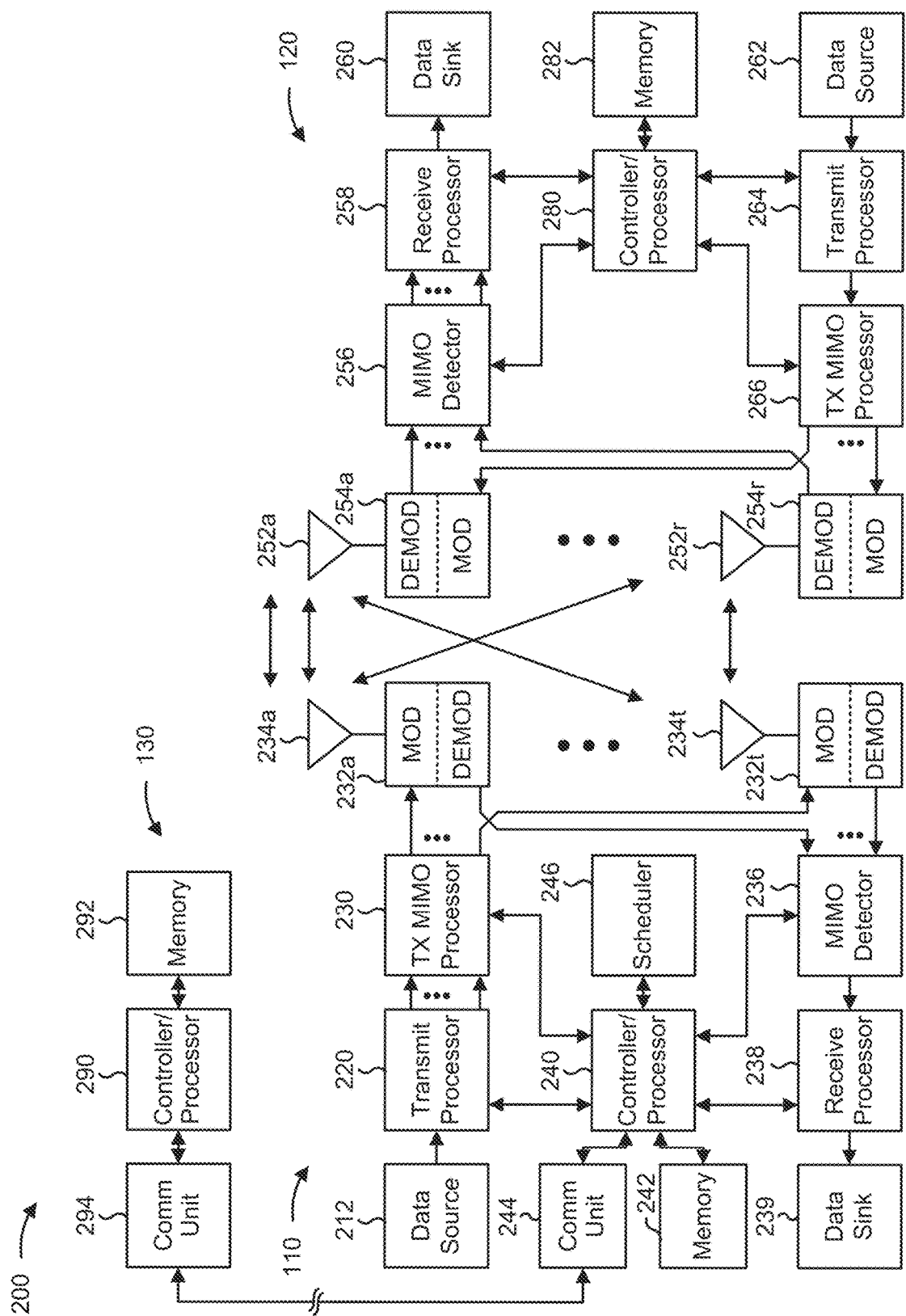
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8A-8B, FIGS. 9A-9D, FIG. 10, and/or FIG. 11.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8A-8B, FIGS. 9A-9D, FIG. 10, and/or FIG. 11.

Controller/processor 240 of base station 110, controller/processor 280 of UE 120, and/or any other component(s) of FIG. 2 may perform one or more techniques associated with event-triggered reference signal transmission for carrier selection, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direction operations of, for example, process 1000 of FIG. 10, process 1100 of FIG. 11, and/or other processes as described herein. In some aspects, executing instructions may include running the instructions, converting the instructions, compiling the instructions, interpreting the instructions, and/or the like.

In some aspects, base station 110 may include means for receiving, from a UE (e.g., UE 120), a message that indicates whether the UE received a downlink transmission from the base station in a first frequency range, means for scheduling one or more reference signal (RS) transmissions in the first frequency range and one or more RS transmissions in a second frequency range based at least in part on the message received from the UE, and means for rescheduling the downlink transmission on a component carrier in either the first frequency range or the second frequency range based at least in part on channel quality information that is determined from the one or more RS transmissions in the first frequency range and the one or more RS transmissions in the second frequency range, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for transmitting, to a base station (e.g., base station 110), a message that indicates whether UE 120 received a downlink transmission from the base station in a first frequency range, means for receiving, from the base station, information related to one or more RS transmissions that are scheduled in the first frequency range and one or more RS transmissions that are scheduled in a second frequency range based at least in part on the message transmitted to the base station, means for receiving the downlink transmission on a component carrier in either the first frequency range or the second frequency range based at least in part on channel quality information that is determined from the one or more RS transmissions in the first frequency range and the one or more RS transmissions in the second frequency range, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
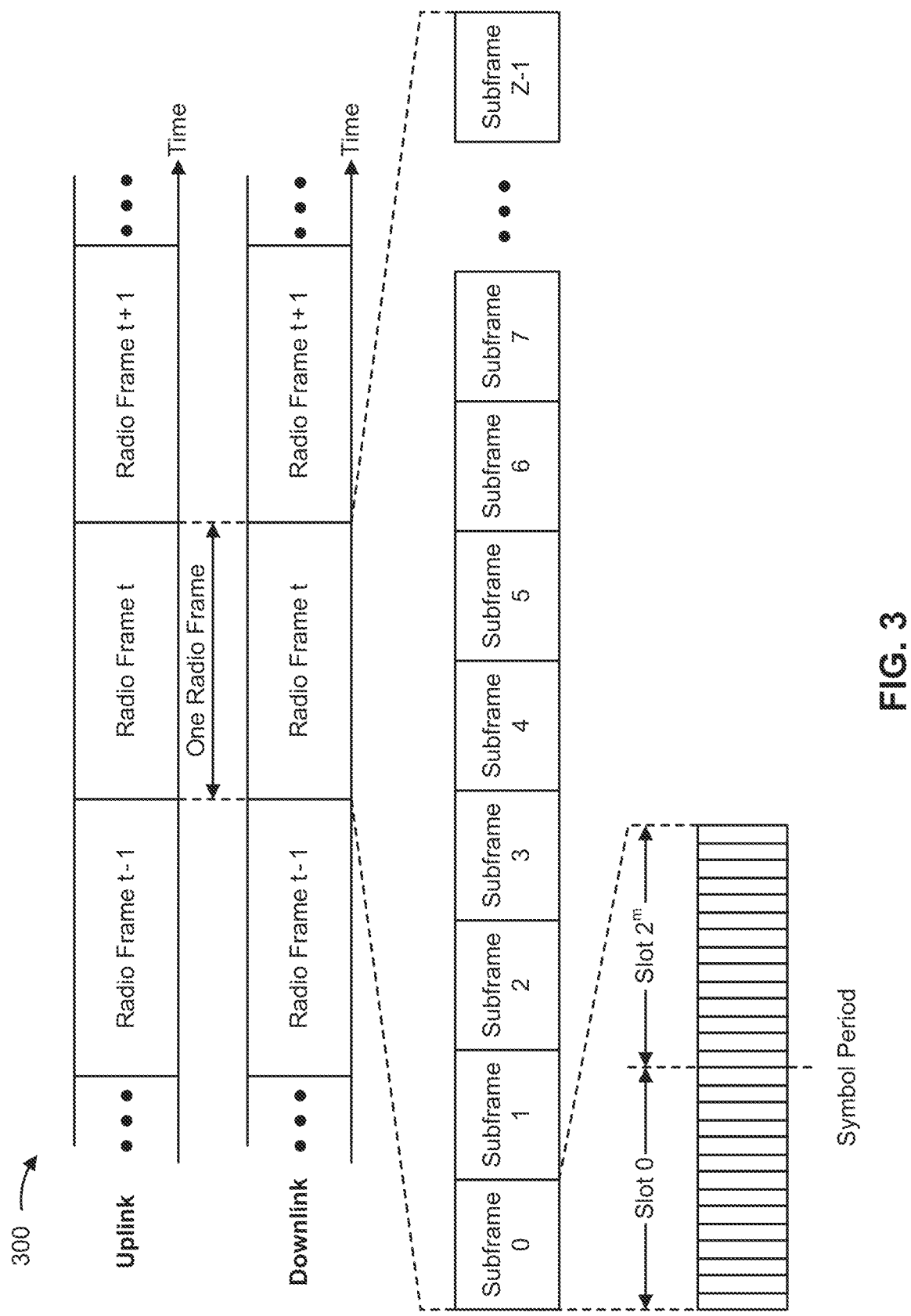
FIG. 3 is a diagram illustrating an example of a frame structure in a wireless communication network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. In some aspects, the base station may transmit the PSS, the SSS, and/or the PBCH in a synchronization signal block (SSB).

As indicated above, FIG. 3 is provided as an example. Other examples may differ from what is described with regard to FIG. 3.

Figure 4:
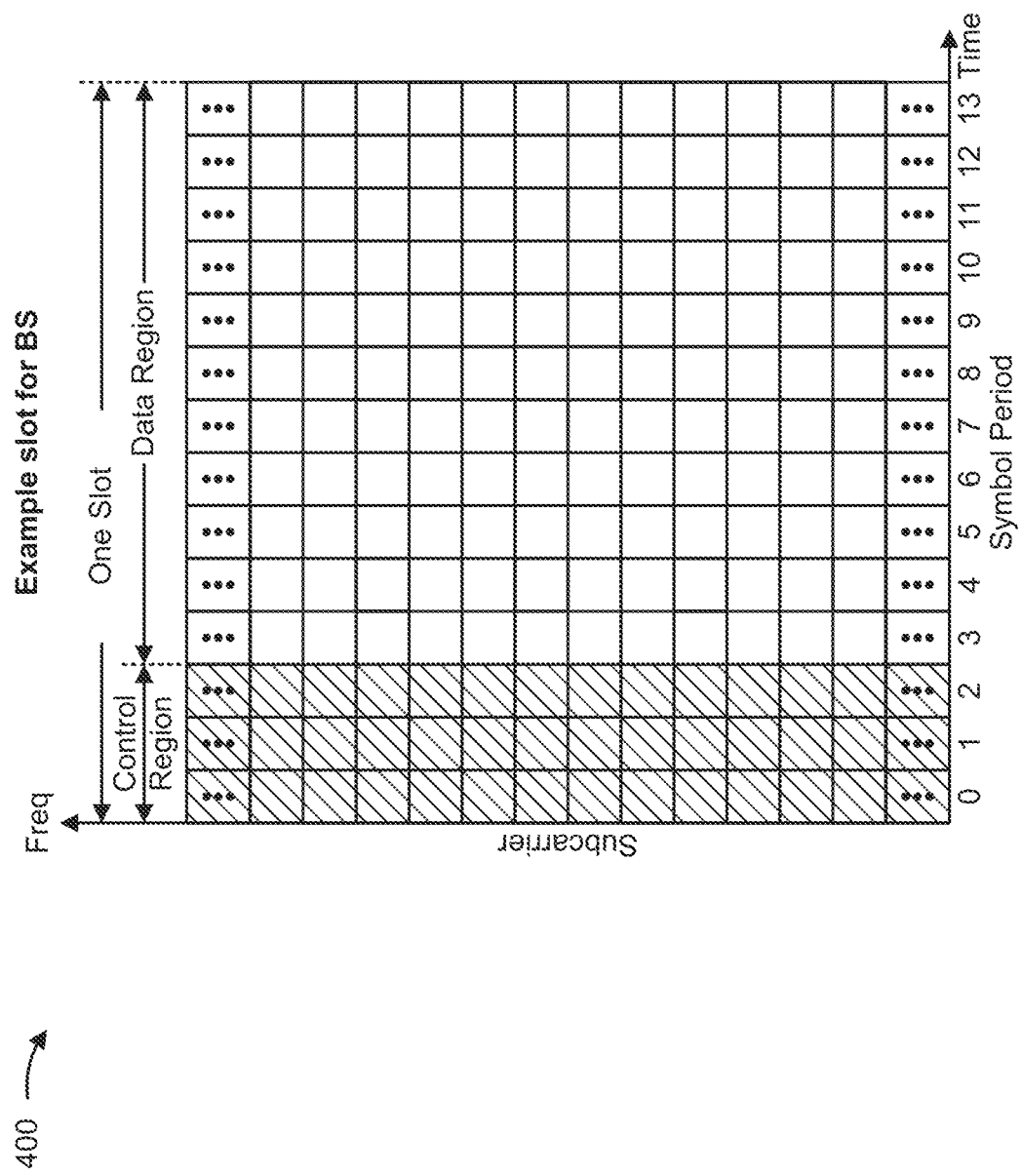
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, and/or the like, where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), a reference signal received power (RSRP), a log likelihood ratio (LLR), a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. "New Radio" (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
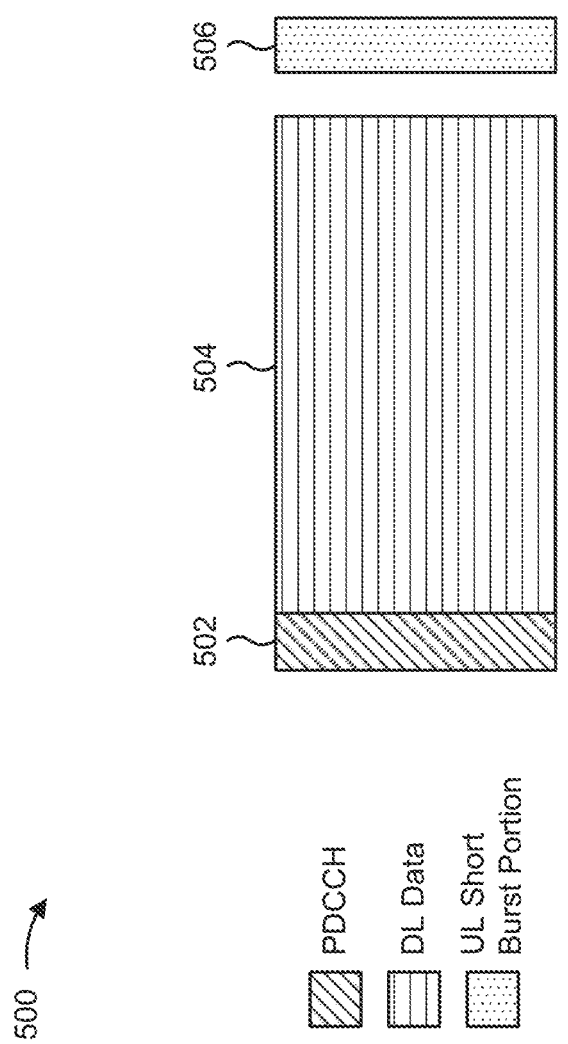
FIG. 5 is a diagram illustrating an example of a downlink (DL)-centric slot, in accordance with various aspects of the present disclosure.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PC- FICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PD SCH).

The DL-centric slot may also include an uplink (UL) short burst portion 506. The UL short burst portion 506 may sometimes be referred to as an uplink burst, an uplink burst portion, a common uplink burst, a short burst, an uplink short burst, a common uplink short burst, a common uplink short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the DL data portion 504. Non-limiting examples of information that may be included in the UL short burst portion 506 include an ACK signal (e.g., a physical UL control channel (PUCCH) ACK, a physical UL shared channel (PUSCH) ACK, an immediate ACK), a NACK signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
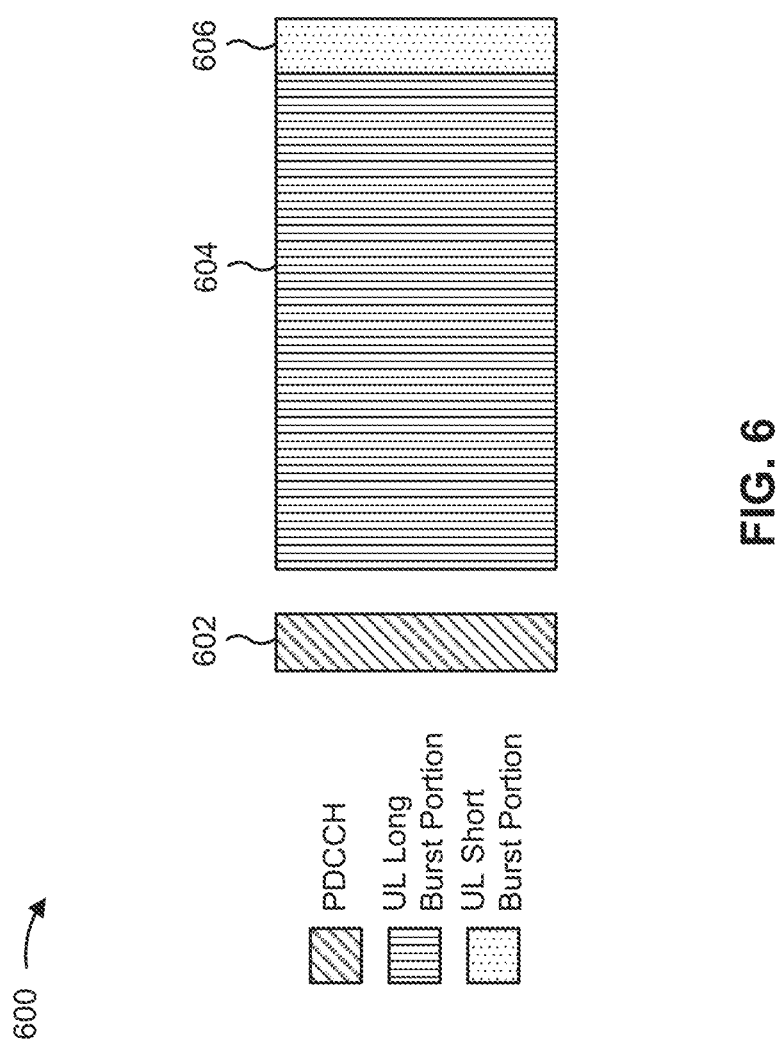
FIG. 6 is a diagram illustrating an example of an uplink (UL)-centric slot, in accordance with various aspects of the present disclosure.

FIG. 6 is a diagram 600 showing an example of an uplink-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an uplink long burst portion 604. The UL long burst portion 604 may sometimes be referred to as the payload of the UL-centric slot. The communication resources utilized to communicate UL data from the subordinate entity (e.g., UE) to the scheduling entity (e.g., UE or BS) may be referred to as the UL portion. In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an uplink (UL) short burst portion 606. The UL short burst portion 606 in FIG. 6 may be similar to the UL short burst portion 506 described above with reference to FIG. 5, and may include any of the information described above in connection with FIG. 5. The foregoing is one example of an uplink-centric wireless communication structure, and alternative structures having similar features may exist without necessarily deviating from the aspects described herein.

As indicated above, FIG. 6 is provided as an example. Other examples may differ from what is described with regard to FIG. 6.

Figure 7:
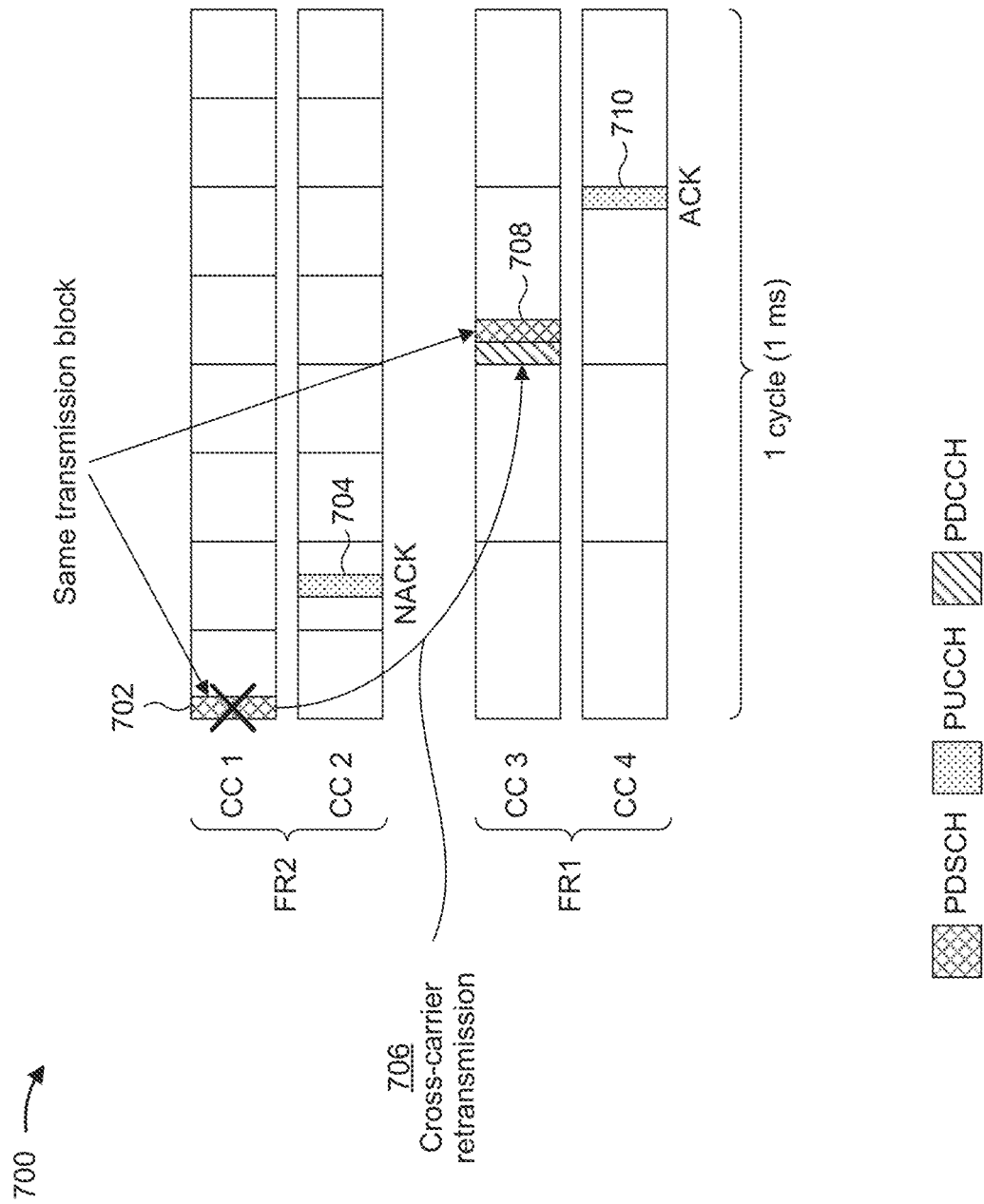
FIG. 7 is a diagram illustrating an example of cross-carrier retransmission, in accordance with various aspects of the present disclosure.

FIG. 7 is a diagram illustrating an example 700 of cross-carrier retransmission, in accordance with various aspects of the present disclosure.

In carrier aggregation, a UE and a base station may communicate via multiple carriers that may have different frequencies. For example, in NR, frequency bands may be separated into different frequency ranges, which may include Frequency Range 1 (FR1) that includes frequency bands below 6 gigahertz (GHz) (also known as sub-6 GHz) and Frequency Range 2 (FR2) that includes millimeter wave (mmW) frequency bands. In general, carrier aggregation features can enable increased bandwidth, increased throughput, increased reliability, and/or the like for communications between the UE and the base station (e.g., using cross-carrier retransmissions across different carriers). For example, although mmW frequencies in FR2 offer higher bandwidth than frequencies in FR1, radio waves in mmW frequencies have very short wavelengths, from one to ten millimeters. Accordingly, transmissions in FR2 are sensitive to blockage and atmospheric attenuation, which tends to limit propagation to a few kilometers or less (e.g., line-of-sight). As a result, in some cases, a transmission (e.g., of a transmission block (TB), a control block group (CBG), and/or the like) in FR2 may fail to reach an intended recipient, may degrade in quality while in transit to the intended recipient, and/or the like.

For example, as shown in FIG. 7, and by reference number 702, a base station may attempt to send a scheduled downlink transmission to a UE via a PDSCH on a first component carrier in FR2, and the UE may fail to receive the downlink transmission (e.g., due to atmospheric absorption, blocking caused by reliability issues, or for some other reason that affects link quality). In this case, as shown by reference number 704, the UE may use a PUCCH to send a negative acknowledgement (NACK) to the base station on a second component carrier in FR2 to indicate that the downlink transmission was not received. Accordingly, as shown by reference number 706, a Medium Access Control (MAC) layer cross-carrier retransmission may be performed to reschedule the failed transmission on a different component carrier for improved reliability. For example, as shown in FIG. 7, and by reference number 708, the base station has rescheduled the failed transmission on a particular component carrier in FR1. In particular, the base station may send information to schedule the retransmission to the UE via a PDCCH and then send the same transmission block that the UE initially failed to receive. As further shown in FIG. 7, and by reference number 710, the UE may send an acknowledgement (ACK) to the base station on another component carrier in FR1 to indicate that the rescheduled transmission was received.

While cross-carrier retransmission can be used to improve reliability, as described above, a scheduler (e.g., the base station) may need to decide whether to reschedule the failed transmission on a component carrier in FR1, a different component carrier in FR2, and/or the like in order to make an informed decision and efficiently use the other component carriers that may be available for the cross-carrier retransmission. In general, this decision can be based on one or more parameters that relate to channel quality on FR1 and/or FR2 (and/or individual component carriers in FR1 and/or FR2) (e.g., SINR, RSRP, LLR, and/or the like), which can be indicated in a report that the base station requests from the UE based on the NACK indicating that the initial transmission failed. However, this approach of requesting that the UE report the channel quality on FR1 and/or FR2 on-demand (e.g., based on the NACK) introduces latency issues because the base station has to initially request the channel quality report and then wait for the UE to provide the channel quality report before selecting the component carrier to be used for the retransmission. Accordingly, in applications that have strict latency requirements or short cycle durations (e.g., URLLC, Industrial IoT (IIoT), and/or the like), there may be insufficient time for the base station to request, receive, and process the channel quality report within timing constraints. Furthermore, although the base station may request that the UE always report the most recent channel quality measurements in uplink feedback to address the latency issue, this approach introduces additional uplink overhead that may cause network congestion or otherwise interfere with network reliability.

As indicated above, FIG. 7 is provided as an example. Other examples may differ from what is described with respect to FIG. 7.

Figure 8A:
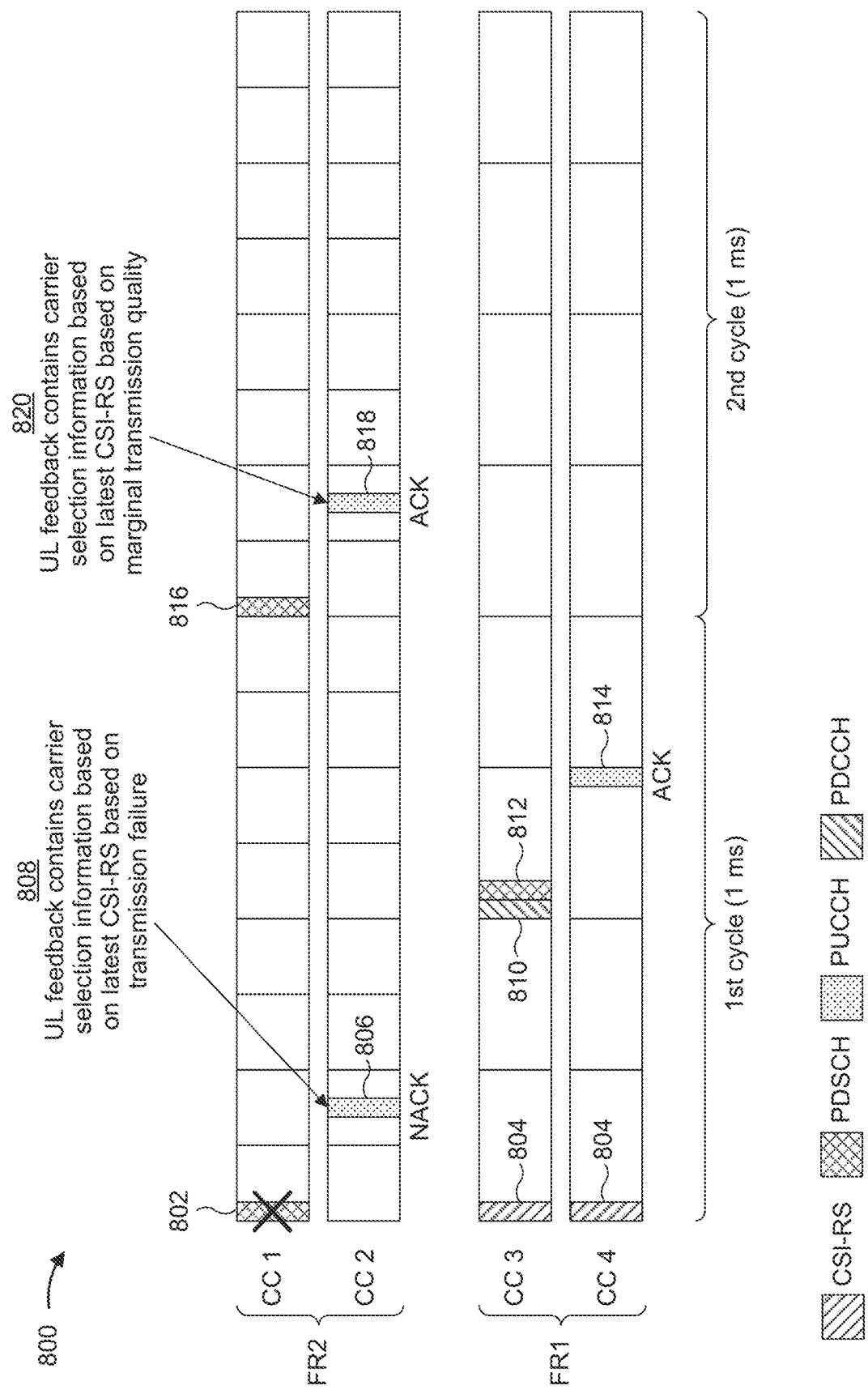
FIGS. 8A-8B are diagrams illustrating examples of event-triggered transmission of a reference signal on a non-serving component carrier to enable cross-carrier retransmission, in accordance with various aspects of the present disclosure.
Figure 8B:
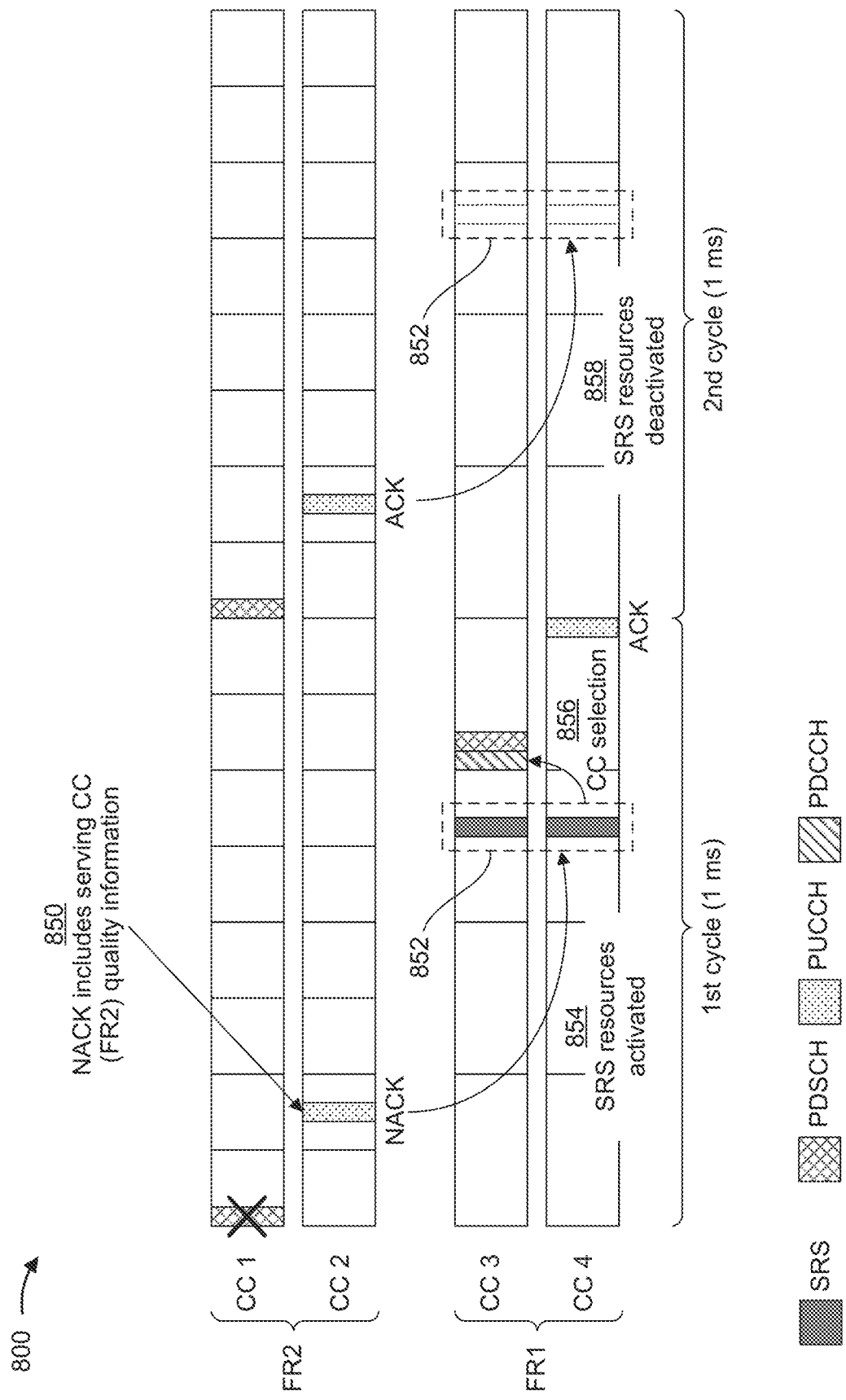

FIGS. 8A-8B are diagrams illustrating examples 800 of event-triggered transmission of a reference signal on a non-serving component carrier to enable cross-carrier retransmission, in accordance with various aspects of the present disclosure. For example, in FIG. 8A, a UE may transmit, to a base station, uplink feedback that includes carrier selection information to enable cross-carrier scheduling and retransmission with low latency and overhead. More particularly, as shown in FIG. 8, and by reference number 802, a base station may attempt to send a PDSCH transmission to a UE on a first component carrier in a first frequency range (e.g., FR2 in the illustrated example), and as further shown by reference number 804, the base station may also send Channel State Information Reference Signals (CSI-RS) to the UE on downlink via multiple component carriers in a second frequency range (e.g., FR1 in the illustrated example). For example, the UE may use the CSI-RS to estimate channels associated with the multiple component carriers in the second frequency range and report the channel quality information back to the base station. In general, the CSI-RS transmissions can be periodic, semi-persistent, or aperiodic (e.g., due to downlink control information (DCI) triggering), and the CSI-RS can start at any OFDM symbol in a slot and occupy 1, 2, or 4 OFDM symbols depending on a configured quantity of ports.

As further shown in FIG. 8A, and by reference number 806, the UE may send a NACK to the base station based on a failure to receive the initial PDSCH transmission. Furthermore, as shown by reference number 808, the NACK that the UE transmits to the UE may include uplink feedback with carrier selection information based on the most recent CSI-RS that the UE received from the base station. For example, in some aspects, the uplink feedback provided by the UE may include one or more indicators that relate to a preferred frequency range, a preferred frequency band within the preferred frequency range, a preferred component carrier within the preferred frequency band, and/or the like, which may generally be defined from coarse to fine for at least a next transmission (or retransmission). Furthermore, in some aspects, the uplink feedback may include a request to suspend and/or resume scheduling on a particular frequency range, frequency band, component carrier, and/or the like. For example, if the UE fails to receive several transmissions on FR2, the UE may request that further transmissions on FR2 be blocked or otherwise suspended for some time, and the UE may subsequently request that the base station resume transmissions on FR2 if and/or when channel conditions recover (e.g., as determined based on the latest CSI-RS). Additionally, or alternatively, the uplink feedback may include one or more general quality indicators for a given frequency range, frequency band, component carrier, and/or the like (e.g., measurements related to SINR, RSRP, LLR, RSRQ, and/or the like, which may be determined instantaneously based on the latest CSI-RS, averaged over time, and/or the like).

Accordingly, in some aspects, the base station may select a frequency range, frequency band, component carrier, and/or the like for scheduling a retransmission based on the uplink feedback that the UE provides with the NACK to indicate that the initial transmission failed. For example, as shown in FIG. 8A, the base station may select a particular component carrier in FR1 based on the NACK indicating that the initial transmission failed and based on the uplink feedback provided by the UE. In particular, as shown by reference number 810, the base station may send a PDCCH transmission to indicate the selected component carrier in FR1, and as shown by reference number 812, may reschedule the PDSCH transmission on the selected component carrier. As further shown by reference number 814, the UE may transmit, to the base station, an ACK to indicate that the rescheduled PDSCH transmission was received.

As further shown in FIG. 8A, and by reference number 816, the base station may send another PDSCH transmission to the UE in a subsequent cycle. For example, as shown in FIG. 8A, the base station may send the next PDSCH transmission via a component carrier in FR2 (e.g., the same component carrier that was used for the previous transmission that failed). Alternatively, in some aspects, the base station may send the next PDSCH transmission via a different component carrier, such as the component carrier used for the previous retransmission, a different component carrier in FR2, and/or the like (e.g., where the uplink feedback provided with the NACK requests suspension of scheduling on the component carrier used for the failed transmission). For example, in cases where a PDSCH transmission fails and is rescheduled one or more times on a different component carrier in the same frequency range or a different frequency range (e.g., over a number of consecutive slots), the base station may reschedule subsequent occasions of the PDSCH transmission on the other component carrier (e.g., because the rescheduling may indicate that channel conditions are better on the other component carrier).

As further shown in FIG. 8A, and by reference number 818, the UE may send an ACK message to the base station on a PUCCH to indicate that the next PDSCH transmission was received. However, in some aspects, the UE may determine that the received PDSCH transmission was received with marginal quality (e.g., with an RSRP, SINR, LLR, and/or the like below a threshold value). Accordingly, as shown by reference number 820, the UE may provide uplink feedback based on the most recent CSI-RS together with the ACK message based on the marginal transmission quality.

In this way, the UE may provide the base station with updated carrier selection information that the base station can use to select a frequency range, a frequency band, a component carrier, and/or the like for rescheduling a failed transmission based on the latest CSI-RS, which may reduce latency, ensure compliance with timing requirements, and/or the like because the base station is provided with the carrier selection information without having to affirmatively request that the UE provide the carrier selection information. Furthermore, by reactively providing the updated carrier selection information in uplink feedback when an initial transmission fails and/or proactively when a transmission is received with marginal quality, the UE does not have to provide the uplink feedback in each cycle, which may reduce overhead.

FIG. 8B is a diagram illustrating an example of event-triggered transmission of a reference signal by a UE on a non-serving component carrier to enable cross-carrier retransmission, in accordance with various aspects of the present disclosure. For example, as described in further detail herein, FIG. 8B illustrates an approach in which the base station schedules or otherwise triggers an uplink sounding reference signal (SRS) transmission from the UE to assess the latest component carrier quality. Accordingly, the SRS transmission from the UE may enable the base station to obtain channel state information that describes how signals propagate from the UE to the base station over the component carriers used for the SRS transmission, which may represent a combined effect from scattering, fading, power decay with distance, and/or the like.

More particularly, as shown in FIG. 8B, and by reference number 850, the UE may provide serving component carrier quality to the base station when providing a NACK to indicate that the UE did not receive a scheduled PDSCH transmission. For example, in some aspects, the UE may provide the serving component carrier quality based on a semi-persistent scheduling (SPS) configuration for a Demodulation Reference Signal (DMRS) on the serving component carrier. Furthermore, as shown by reference number 852, the base station may preconfigure one or more SRS resources to be used to send the SRS transmissions on the non-serving component carriers, and to save overhead, the SRS resources may be activated only when an initial attempt to send a PDSCH transmission to the UE fails. For example, as shown by reference number 854, the base station may activate the preconfigured SRS resources based on the UE providing the NACK to indicate that the initial PDSCH transmission was not received. Additionally, or alternatively, the base station may activate the preconfigured SRS resources based on discontinuous transmission (DTX) by the UE (e.g., non-receipt of an ACK/NACK by the base station) after an attempted downlink transmission.

Accordingly, the UE may send the SRS transmissions to the base station using the preconfigured SRS resources that are activated based on the NACK and/or DTX following the initial attempt of the base station to send the PDSCH transmission to the UE. As shown by reference number 856, the base station may select a component carrier for the retransmission based on the serving component carrier quality information that the UE provided with the NACK and based on channel state information that the base station determines based on the SRS transmissions from the UE. Furthermore, as shown by reference number 858, the base station may deactivate the preconfigured SRS resources based on the UE providing an ACK to indicate that an initial attempted transmission was received. In this way, interference is reduced by the base station scheduling the SRS transmissions only in cases where the base station receives a NACK or no reply (DTX) from the UE after an attempted transmission. Furthermore, compared to a DCI-based SRS scheduling, triggering the SRS transmissions based on the NACK/DTX saves DCI and scheduling offsets.

As indicated above, FIGS. 8A-8B are provided as one or more examples. Other examples may differ from what is described with respect to FIGS. 8A-8B.

FIGS. 9A-9D are diagrams illustrating various examples 900 of event-triggered transmissions of reference signals on serving and non-serving component carriers to enable cross-carrier retransmission, in accordance with various aspects of the present disclosure.

Figure 9A:
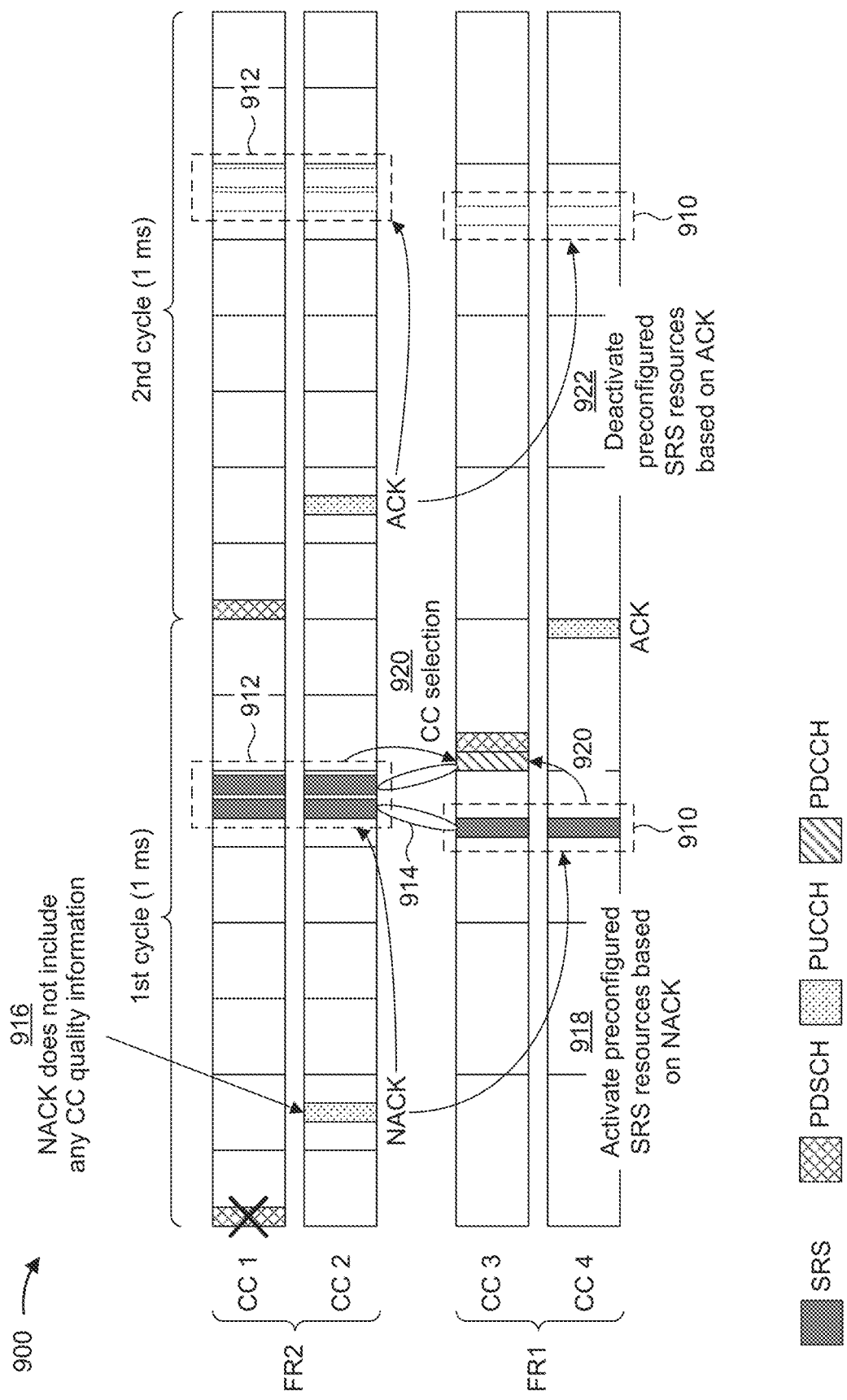

More particularly, FIG. 9A illustrates an example approach in which a base station may schedule uplink SRS transmissions from the UE to the base station on serving and non-serving component carriers to obtain channel quality information to be used when selecting a frequency range, frequency band, component carrier, a beam within a component carrier, and/or the like to be used when rescheduling a failed transmission. For example, as shown by reference number 910, the base station may preconfigure SRS resources on each component carrier in a non-serving frequency range, and as shown by reference number 912, the base station may preconfigure SRS resources on each component carrier in a serving frequency range. In some aspects, the preconfigured SRS resources in the non-serving frequency range and the preconfigured SRS resources in the serving frequency range may be staggered in time to enable the base station to process the uplink transmissions for each frequency range sequentially. Furthermore, as shown by reference number 914, the SRS transmissions in FR2 may be scheduled to be sent in a beam sweep to enable the base station to measure different candidate beams for each candidate component carrier in FR2. For example, beamforming may generally be supported on component carriers in FR2 (e.g., mmW frequencies) but not for FR1 (e.g., sub-6 GHz frequencies). Accordingly, in some aspects, the SRS transmissions in FR2 may be sent by the UE and received by the base station in a beam sweep, but the SRS transmissions in FR1 may be single (e.g., unidirectional) transmissions.

In some aspects, as shown by reference number 916, the base station may receive a NACK from the UE that does not include any component carrier quality information following an initial PDSCH transmission attempt (e.g., in contrast to the example shown in FIG. 8B, where the NACK included quality information for serving component carriers). Additionally, or alternatively, the base station may not receive any response from the UE following the initial PDSCH transmission attempt. Accordingly, as shown by reference number 918, the base station may activate the preconfigured SRS resources on the component carriers in both the serving and non-serving component carriers, which may cause the UE to send the SRS transmissions to the base station. Furthermore, as mentioned above, the SRS transmissions on the serving and non-serving component carriers may be staggered in time to enable the base station to process the SRS transmissions sequentially for each frequency range, and the UE may send the SRS transmissions on FR2 in a beam sweep to enable the base station to measure channel quality for different candidate beams for each candidate component carrier in FR2 (e.g., FIG. 9A illustrates an example in which the SRS transmissions in FR1 are sent prior to the beamswept transmissions in FR2).

As further shown in FIG. 9A, and by reference number 920, the base station may select a component carrier for rescheduling the failed transmission based on the channel quality information determined by the base station from the SRS transmissions on the serving and non-serving component carriers. For example, in FIG. 9A, the base station may select a particular component carrier in FR1 based on FR1 having better channel conditions than FR2, based on the selected component carrier having the best channel quality among multiple component carriers in FR1, and/or the like. Furthermore, in cases where the base station selects a component carrier in FR2, the component carrier selection may further include a selection of one or more particular beams to be used for the retransmission. Additionally, in some aspects, as shown by reference number 922, the base station may deactivate the preconfigured SRS transmissions such that the UE does not send the SRS transmissions when the UE provides an ACK to indicate that the initial transmission was received. In this way, the base station may save overhead by only scheduling the uplink SRS transmissions when the UE fails to receive or otherwise fails to acknowledge an attempted downlink transmission. Furthermore, by preconfiguring the SRS resources to be used for the SRS transmissions and dynamically activating the SRS resources based on a NACK or DTX following an attempted downlink transmission, the base station may obtain the channel quality information for the serving and non-serving component carriers with less latency, which may enable the base station to reschedule the failed transmission within the same cycle and thereby satisfy latency and/or other timing requirements.

Furthermore, in some aspects, the base station may schedule one or more subsequent downlink transmission occasions in one or more subsequent cycles on the component carrier that is selected for the retransmission. For example, in cases where a downlink transmission fails and is rescheduled one or more times on a different component carrier in the same frequency range or a different frequency range (e.g., over a number of consecutive slots), the base station may reschedule subsequent occasions of the downlink transmission on the other component carrier (e.g., because the rescheduling may indicate that channel conditions are better on the other component carrier). Accordingly, in such cases, the base station may transmit, and the UE may receive, information indicating the change to the component carrier on which the subsequent downlink transmission occasions are scheduled.

Figure 9B:
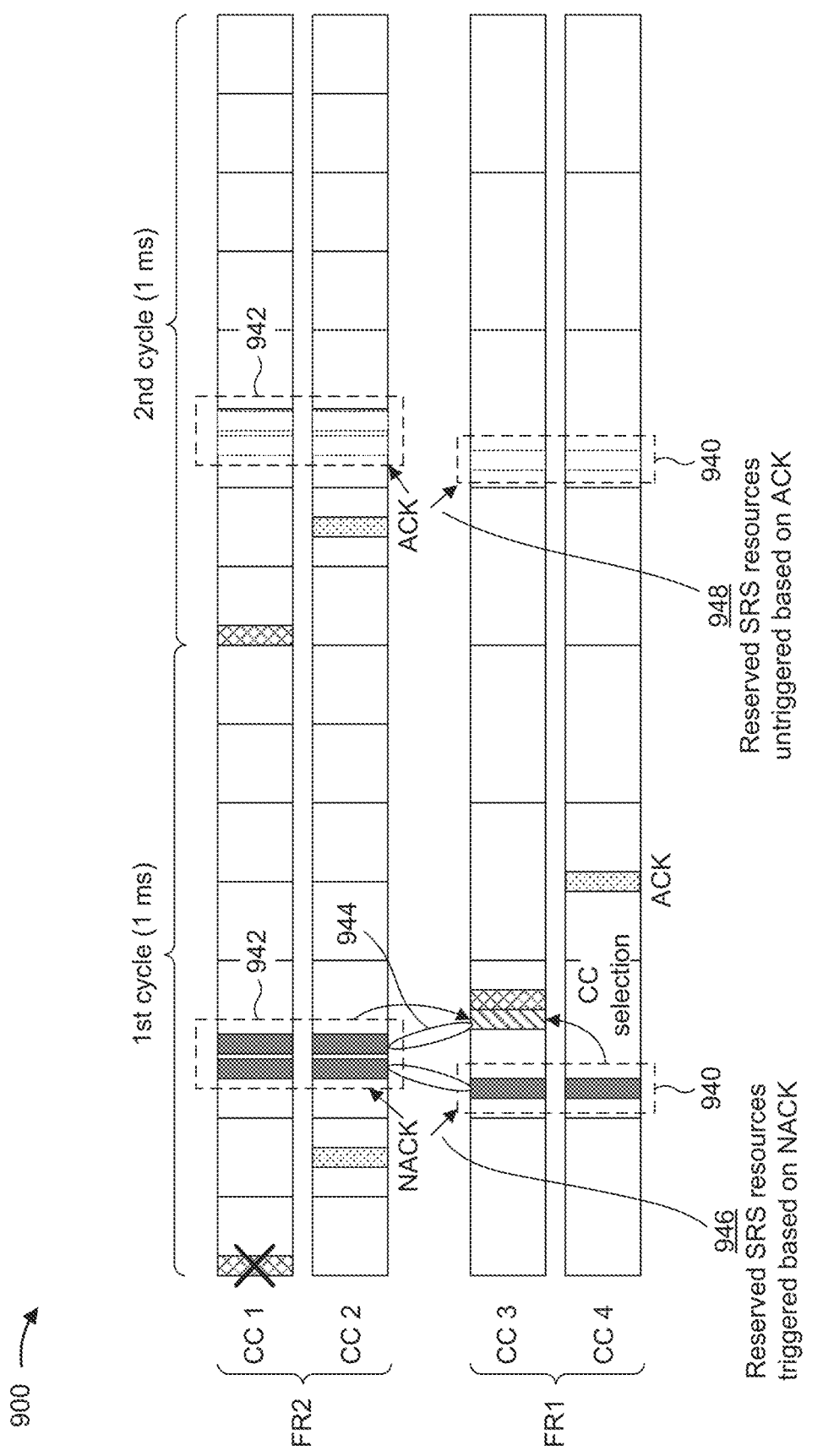

FIG. 9B illustrates an example approach in which a base station may schedule uplink SRS transmissions using SRS resources that are persistently reserved on serving and non-serving component carriers to obtain channel quality information that the base station may use to select a frequency range, a frequency band, a component carrier, a beam within a component carrier, and/or the like when rescheduling a failed transmission. For example, as shown by reference number 940, the base station may reserve a set of SRS resources on each component carrier in a non-serving frequency range, and as shown by reference number 942, the base station may reserve SRS resources on each component carrier in a serving frequency range. In some aspects, the SRS resources in the serving and non-serving frequency ranges may be reserved within a short offset from a slot, a symbol, and/or the like in which the UE is scheduled to send an ACK/NACK message to indicate whether a downlink transmission was received. Furthermore, as shown in FIG. 9B, the reserved SRS resources in the non-serving frequency range and the reserved SRS resources in the serving frequency range may be staggered in time to enable the base station to process the uplink transmissions for each frequency range sequentially. Furthermore, as shown by reference number 944, the SRS transmissions in FR2 may be scheduled to be sent in a beam sweep to enable the base station to measure different candidate beams for each candidate component carrier in FR2.

In some aspects, as shown by reference number 946, the base station may schedule or otherwise trigger uplink SRS transmissions from the UE using the reserved SRS resources based on receiving a NACK from the UE following an initial PDSCH transmission attempt. Additionally, or alternatively, the base station may not receive any response from the UE following the initial PDSCH transmission attempt. In either case, the base station may trigger the SRS transmissions using the reserved SRS resources on the component carriers in both the serving and non-serving component carriers based on the NACK (or DTX or other non-acknowledgement), which may cause the UE to send the SRS transmissions to the base station. Furthermore, as mentioned above, the SRS transmissions on the serving and non-serving component carriers may be staggered in time to enable the base station to process the SRS transmissions sequentially for each frequency range, and the UE may send the SRS transmissions on FR2 in a beam sweep to enable the base station to measure channel quality for different candidate beams for each candidate component carrier in FR2 (e.g., FIG. 9B illustrates an example in which the SRS transmissions in FR1 are sent prior to the beamswept transmissions in FR2).

Accordingly, the base station may select a component carrier for rescheduling the failed transmission based on the channel quality information determined by the base station from the SRS transmissions on the serving and non-serving component carriers. In some aspects, compared to the approach shown in FIG. 9A, the base station may select a particular component carrier for the rescheduled transmission with a lower latency because the SRS resources are reserved with a shorter offset from the scheduled ACK/NACK transmission relative to the preconfigured SRS resources. Furthermore, in some aspects, the approach shown in FIG. 9B may offer additional overhead savings (e.g., saving PUCCH resources) by only using the SRS transmissions to indicate NACK/ACK for the attempted downlink transmission. For example, the UE may send the SRS transmissions to indicate a NACK for the attempted downlink transmission or perform DTX (e.g., non-transmission) of the SRS transmissions to indicate an ACK for the attempted downlink transmission. Additionally, or alternatively, as shown by reference number 948, the base station may not trigger the SRS transmissions using the reserved SRS resources based on receiving an ACK from the UE to indicate that the UE received an attempted downlink transmission.

FIG. 9C illustrates another example approach in which a base station may schedule uplink SRS transmissions using SRS resources that are preconfigured and/or persistently reserved on serving and non-serving component carriers to obtain channel quality information that the base station may use to select a frequency range, a frequency band, a component carrier, a beam within a component carrier, and/or the like when rescheduling a downlink transmission. In general, the approach shown in FIG. 9C may be similar to the approaches shown in FIGS. 9A-9B, except that the uplink SRS transmissions are scheduled (e.g., by activating preconfigured SRS resources and/or triggering reserved SRS resources) based on an ACK message that indicates that serving component carrier quality fails to satisfy a threshold value.

For example, in some aspects, the base station may configure one or more threshold values that relate to channel quality on serving component carriers, which may be based on SINR, RSRP, LLR, and/or other suitable parameters. Accordingly, based on the UE receiving an attempted downlink transmission and determining that one or more parameters on the serving component carrier fail to satisfy a threshold value configured by the base station, the UE may send an ACK to the base station with one or more indicators to indicate that the serving component carrier quality fails to satisfy the applicable threshold value(s), as shown by reference number 960. In some aspects, as shown by reference number 962, the base station may schedule uplink SRS transmissions (e.g., using persistently reserved SRS resources, preconfigured SRS resources, and/or the like) based on the ACK indicating that the serving component carrier quality fails to satisfy the threshold value(s), and select a component carrier for rescheduling the downlink transmission and/or the like based on channel quality information determined by the base station based on the uplink SRS transmissions.

Figure 9D:
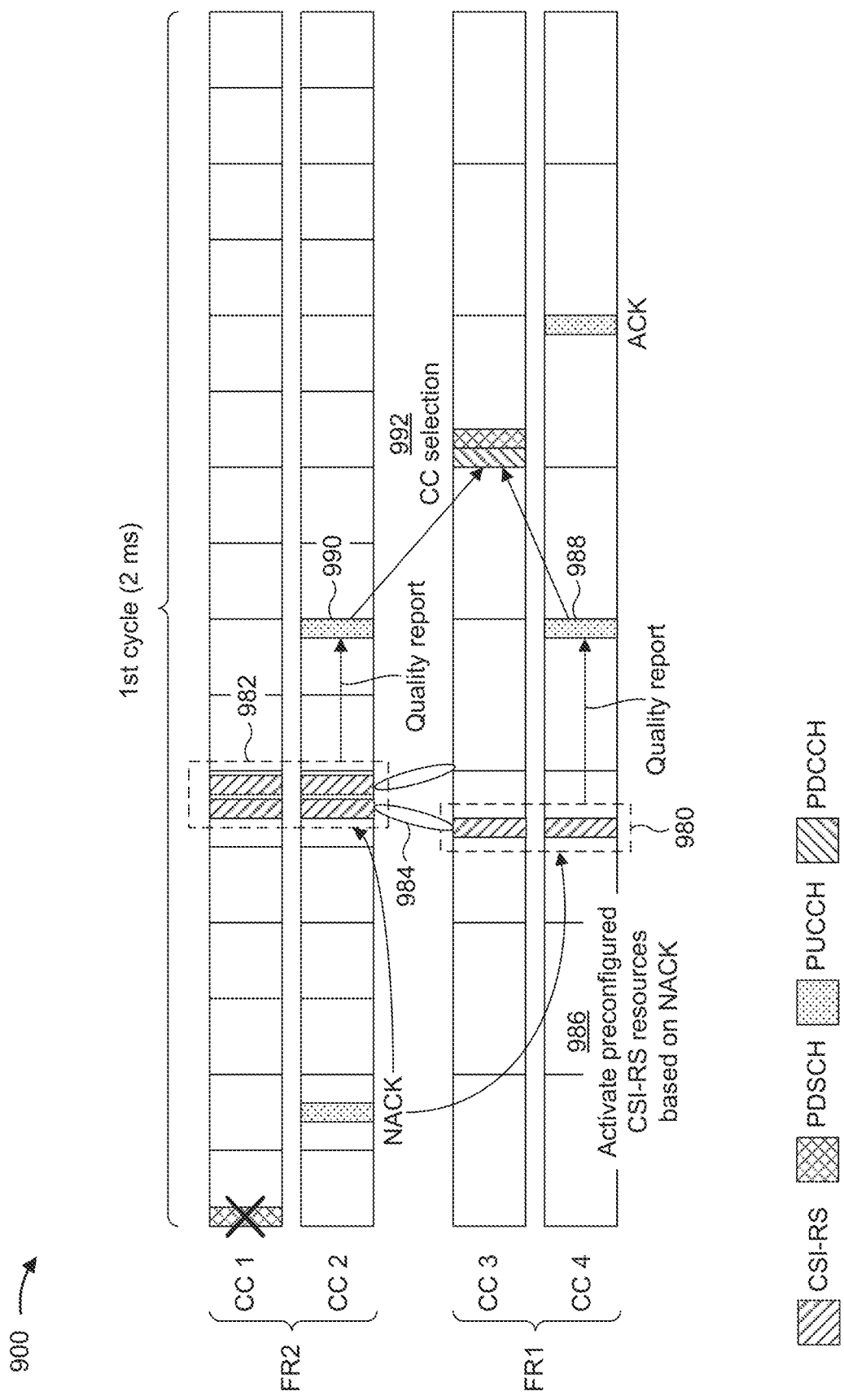

FIG. 9D illustrates an example approach in which a base station may schedule one or more downlink reference signal transmissions (e.g., CSI-RS transmissions) to a UE to request a channel quality report for serving and non-serving component carriers, to obtain information for selecting a frequency range, a frequency band, a component carrier, a beam within a component carrier, and/or the like after a failed retransmission that relates to a service having a cycle duration that satisfies a threshold value. For example, in cases where latency is not a concern or timing requirements are not strict, there may be enough time for the base station to request that the UE obtain measurements that relate to channel quality on the serving and non-serving component carriers and provide a channel quality report indicating current conditions on the serving and non-serving component carriers. In this way, the channel quality information that the base station uses to select the frequency range, a frequency band, a component carrier, a beam within a component carrier, and/or the like for cross-carrier retransmission may more accurately reflect downlink channel conditions that are experienced at the UE.

For example, as shown by reference number 980, the base station may preconfigure CSI-RS resources on each component carrier in a non-serving frequency range, and as shown by reference number 982, the base station may preconfigure CSI-RS resources on each component carrier in a serving frequency range. In some aspects, the preconfigured CSI-RS resources in the non-serving frequency range and the preconfigured CSI-RS resources in the serving frequency range may be staggered in time to enable the UE to process the downlink CSI-RS transmissions for each frequency range sequentially. Furthermore, as shown by reference number 984, the base station may send the CSI-RS transmissions in FR2 in a beam sweep to enable the UE to measure different candidate beams for each candidate component carrier in FR2.

In some aspects, the base station may receive a NACK from the UE that does not include any component carrier quality information following an initial PDSCH transmission attempt. Additionally, or alternatively, the base station may not receive any response from the UE following the initial PDSCH transmission attempt. Accordingly, as shown by reference number 986, the base station may activate the preconfigured CSI-RS resources on the component carriers in both the serving and non-serving component carriers and subsequently send the CSI-RS transmissions to the UE on a downlink. In some aspects, to further save overhead, the CSI-RS resources may be activated and used to send the CSI-RS transmissions only on the non-serving component carriers, based on the NACK received from the UE including channel quality information for the serving component carriers.

As further shown in FIG. 9D, and by reference number 988, the UE may send a PUCCH transmission to the base station that includes a channel quality report for the non-serving component carriers based on channel state information that the UE determines from the downlink CSI-RS transmissions on the non-serving component carriers. Furthermore, in some aspects (e.g., where the NACK does not include any channel quality information for the serving component carriers), the UE may send a PUCCH transmission to the base station that includes a channel quality report for the serving component carriers based on channel state information that the UE determines from the downlink CSI-RS transmissions on the serving component carriers, as shown by reference number 990. As further shown in FIG. 9D, and by reference number 992, the base station may select a component carrier for rescheduling the failed transmission based on the channel quality report(s) received from the UE, any channel quality information that the UE may have provided with the NACK, and/or the like. Additionally, in some aspects, the base station may deactivate or otherwise cancel downlink resources allocated to the CSI-RS transmissions and uplink resources allocated to the channel quality report when the UE provides an ACK to indicate that the initial transmission was received. In this way, the base station may save overhead by only scheduling the downlink CSI-RS transmissions and the uplink channel quality report when the UE fails to receive an attempted downlink transmission, fails to acknowledge an attempted downlink transmission, and/or the like. Furthermore, by preconfiguring and/or reserving the CSI-RS resources to be used for the CSI-RS transmissions and dynamically triggering the CSI-RS transmissions based on a NACK or DTX following an attempted downlink transmission, the base station may obtain the channel quality information for the serving and non-serving component carriers with less latency compared with other approaches that typically use DCI to trigger CSI-RS transmissions. For example, the NACK-triggered approach shown in FIG. 9D may save time by avoiding a DCI and scheduling offset, which is at least greater than a beam switch latency threshold from a beam sweep based CSI-RS transmission on FR2.

As indicated above, FIGS. 9A-9D are provided as one or more examples. Other examples may differ from what is described with respect to FIGS. 9A-9D.

Figure 10:
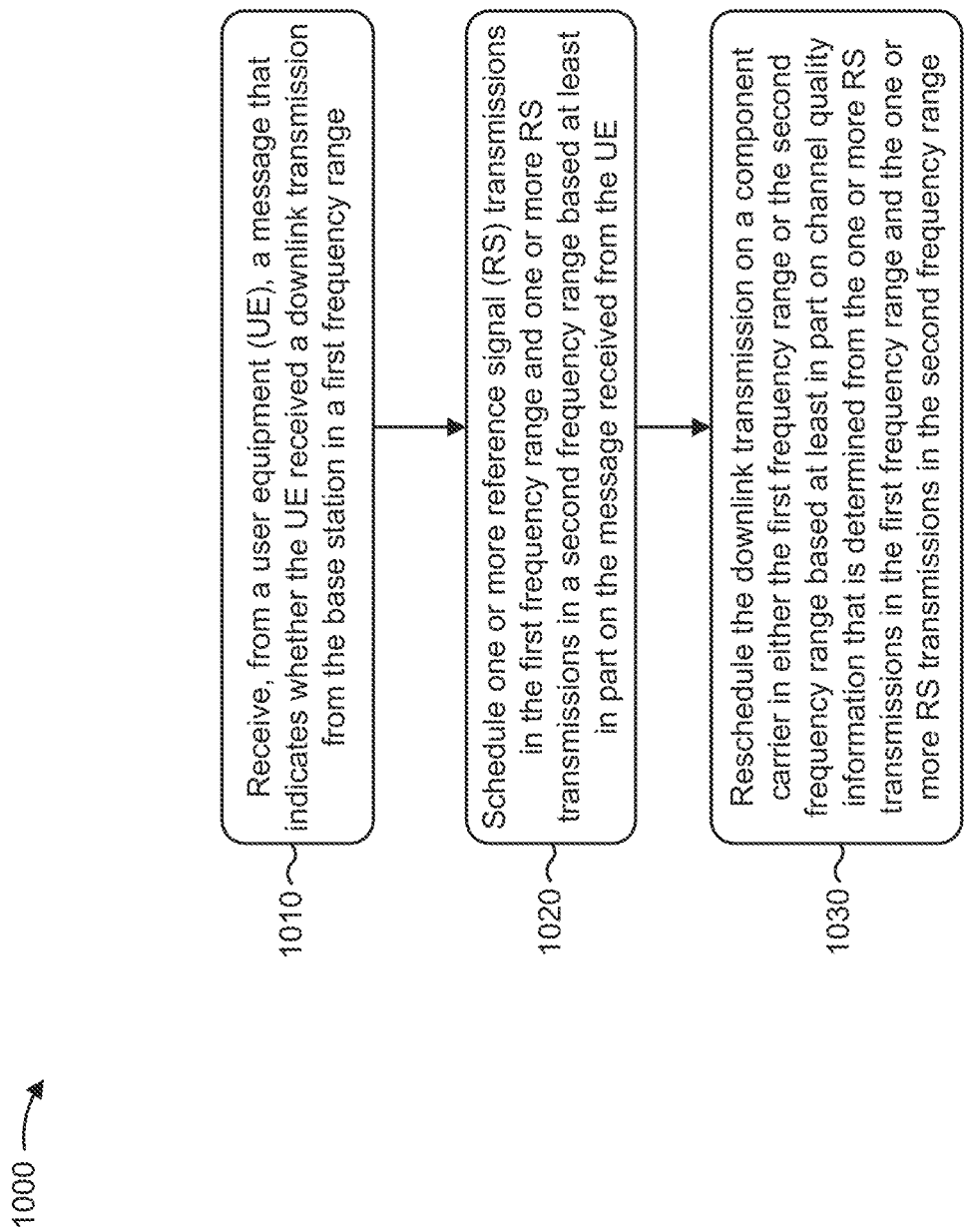
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where a base station (e.g., base station 110) schedules one or more reference signal transmissions to assess channel quality on component carriers in different frequency ranges in order to select a suitable carrier (e.g., to enable cross-carrier retransmission with low latency and reduced overhead).

As shown in FIG. 10, in some aspects, process 1000 may include receiving, from a UE, a message that indicates whether the UE received a downlink transmission from the base station in a first frequency range (block 1010). For example, the base station (e.g., using receive processor 238, controller/processor 240, memory 242, and/or the like) may receive, from a UE, a message that indicates whether the UE received a downlink transmission from the base station in a first frequency range, as described above.

As further shown in FIG. 10, in some aspects, process 1000 may include scheduling one or more reference signal (RS) transmissions in the first frequency range and one or more RS transmissions in a second frequency range based at least in part on the message received from the UE (block 1020). For example, the base station (e.g., using transmit processor 220, receive processor 238, controller/processor 240, memory 242, and/or the like) may schedule one or more RS transmissions in the first frequency range and one or more RS transmissions in a second frequency range based at least in part on the message received from the UE, as described above.

As further shown in FIG. 10, in some aspects, process 1000 may include rescheduling the downlink transmission on a component carrier in either the first frequency range or the second frequency range based at least in part on channel quality information that is determined from the one or more RS transmissions in the first frequency range and the one or more RS transmissions in the second frequency range (block 1030). For example, the base station (e.g., using transmit processor 220, receive processor 238, controller/processor 240, memory 242, and/or the like) may reschedule the downlink transmission on a component carrier in either the first frequency range or the second frequency range based at least in part on channel quality information that is determined from the one or more RS transmissions in the first frequency range and the one or more RS transmissions in the second frequency range, as described above.

Process 1000 may include additional aspects, such as any single aspect or any combination of aspects described below and/or in connection with one or more other processes described elsewhere herein.

In a first aspect, the one or more RS transmissions in the first frequency range are transmitted in a beam sweep to enable the channel quality information to be determined for multiple candidate beams associated with one or more component carriers in the first frequency range.

In a second aspect, alone or in combination with the first aspect, the base station may receive, from the UE, the one or more RS transmissions in the first frequency range in the beam sweep, and determine the channel quality information for the multiple candidate beams associated with the one or more component carriers in the first frequency range based at least in part on the one or more RS transmissions received in the beam sweep.

In a third aspect, alone or in combination with one or more of the first and second aspects, the base station may transmit the one or more RS transmissions in the first frequency range to the UE in the beam sweep, to enable the UE to determine the channel quality information for the multiple candidate beams associated with the one or more component carriers in the first frequency range based at least in part on the one or more RS transmissions transmitted in the beam sweep.

In a fourth aspect, alone or in combination with one or more of the first through third aspects, the one or more RS transmissions in the first frequency range and the one or more RS transmissions in the second frequency range are scheduled at different times.

In a fifth aspect, alone or in combination with one or more of the first through fourth aspects, the message received from the UE is a negative acknowledgement to indicate that the downlink transmission was not received.

In a sixth aspect, alone or in combination with one or more of the first through fifth aspects, the one or more RS transmissions in the first frequency range and the second frequency range are scheduled on preconfigured resources that are activated based on the negative acknowledgement.

In a seventh aspect, alone or in combination with one or more of the first through sixth aspects, the one or more RS transmissions in the first frequency range and the second frequency range are scheduled on reserved resources that have a predefined offset from the negative acknowledgement.

In an eighth aspect, alone or in combination with one or more of the first through seventh aspects, the message received from the UE is an acknowledgement to indicate that the downlink transmission was received on a serving component carrier with one or more parameters failing to satisfy a threshold value.

In a ninth aspect, alone or in combination with one or more of the first through eighth aspects, the one or more parameters include at least one of a signal-to-interference-plus-noise ratio, a reference signal received power, or a log likelihood ratio.

In a tenth aspect, alone or in combination with one or more of the first through ninth aspects, the base station may configure the threshold value.

In an eleventh aspect, alone or in combination with one or more of the first through tenth aspects, the one or more RS transmissions comprise uplink SRS transmissions from the UE to the base station based at least in part on the downlink transmission relating to a low-latency service.

In a twelfth aspect, alone or in combination with one or more of the first through eleventh aspects, the base station may determine the channel quality information based at least in part on the uplink SRS transmissions.

In a thirteenth aspect, alone or in combination with one or more of the first through twelfth aspects, the uplink SRS transmissions are used as the message to indicate that the downlink transmission was not received by the UE.

In a fourteenth aspect, alone or in combination with one or more of the first through thirteenth aspects, the one or more RS transmissions comprise downlink CSI-RS transmissions to the UE based at least in part on the downlink transmission relating to a service having a cycle duration that satisfies a threshold value.

In a fifteenth aspect, alone or in combination with one or more of the first through fourteenth aspects, the UE determines the channel quality information based at least in part on the downlink CSI-RS transmissions, and the base station may receive, from the UE, a report containing the channel quality information and select the component carrier for rescheduling the downlink transmission based at least in part on the report containing the channel quality information.

In a sixteenth aspect, alone or in combination with one or more of the first through fifteenth aspects, the downlink CSI-RS transmissions are scheduled on only a set of non-serving component carriers in the first frequency range based at least in part on the message received from the UE including channel quality information relating to a serving component carrier in the first frequency range.

In a seventeenth aspect, alone or in combination with one or more of the first through sixteenth aspects, the first frequency range is a millimeter wave frequency range and the second frequency range is a sub-6 gigahertz frequency range.

In an eighteenth aspect, alone or in combination with one or more of the first through seventeenth aspects, process 1000 further includes scheduling a next occasion of the downlink transmission in one or more subsequent cycles on the component carrier in either the first frequency range or the second frequency range based at least in part on the channel quality information determined from the one or more RS transmissions.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a UE, in accordance with various aspects of the present disclosure. Example process 1100 is an example where a UE (e.g., UE 120) transmits one or more reference signals, channel quality reports, and/or the like to a base station to enable the base station to select a suitable carrier (e.g., to enable cross-carrier retransmission with low latency and reduced overhead).

As shown in FIG. 11, in some aspects, process 1100 may include transmitting, to a base station, a message that indicates whether the UE received a downlink transmission from the base station in a first frequency range (block 1110). For example, the UE (e.g., using transmit processor 264, controller/processor 280, memory 282, and/or the like) may transmit, to a base station, a message that indicates whether the UE received a downlink transmission from the base station in a first frequency range, as described above.

As further shown in FIG. 11, in some aspects, process 1100 may include receiving, from the base station, information related to one or more RS transmissions that are scheduled in the first frequency range and one or more RS transmissions that are scheduled in a second frequency range based at least in part on the message transmitted to the base station (block 1120). For example, the UE (e.g., using receive processor 258, controller/processor 280, memory 282, and/or the like) may receive, from the base station, information related to one or more RS transmissions that are scheduled in the first frequency range and one or more RS transmissions that are scheduled in a second frequency range based at least in part on the message transmitted to the base station, as described above.

As further shown in FIG. 11, in some aspects, process 1100 may include receiving the downlink transmission on a component carrier in either the first frequency range or the second frequency range based at least in part on channel quality information that is determined from the one or more RS transmissions in the first frequency range and the one or more RS transmissions in the second frequency range (block 1130). For example, the UE (e.g., using receive processor 258, controller/processor 280, memory 282, and/or the like) may receive the downlink transmission on a component carrier in either the first frequency range or the second frequency range based at least in part on channel quality information that is determined from the one or more RS transmissions in the first frequency range and the one or more RS transmissions in the second frequency range, as described above.

Process 1100 may include additional aspects, such as any single aspect or any combination of aspects described below and/or in connection with one or more other processes described elsewhere herein.

In a first aspect, the one or more RS transmissions in the first frequency range are transmitted in a beam sweep to enable the channel quality information to be determined for multiple candidate beams associated with one or more component carriers in the first frequency range.

In a second aspect, alone or in combination with the first aspect, the UE may transmit, to the base station, the one or more RS transmissions in the first frequency range in the beam sweep to enable the base station to determine the channel quality information for the multiple candidate beams associated with the one or more component carriers in the first frequency range.

In a third aspect, alone or in combination with one or more of the first and second aspects, the UE may receive, from the base station, the one or more RS transmissions in the first frequency range in the beam sweep, and determine the channel quality information for the multiple candidate beams associated with the one or more component carriers in the first frequency range based at least in part on the one or more RS transmissions received in the beam sweep.

In a fourth aspect, alone or in combination with one or more of the first through third aspects, the one or more RS transmissions in the first frequency range and the one or more RS transmissions in the second frequency range are scheduled at different times.

In a fifth aspect, alone or in combination with one or more of the first through fourth aspects, the message transmitted to the base station is a negative acknowledgement to indicate that the downlink transmission was not received.

In a sixth aspect, alone or in combination with one or more of the first through fifth aspects, the one or more RS transmissions in the first frequency range and the second frequency range are scheduled on preconfigured resources that are activated based on the negative acknowledgement.

In a seventh aspect, alone or in combination with one or more of the first through sixth aspects, the one or more RS transmissions in the first frequency range and the second frequency range are scheduled on reserved resources that have a predefined offset from the negative acknowledgement.

In an eighth aspect, alone or in combination with one or more of the first through seventh aspects, the message transmitted to the base station is an acknowledgement to indicate that the downlink transmission was received on a serving component carrier with one or more parameters failing to satisfy a threshold value.

In a ninth aspect, alone or in combination with one or more of the first through eighth aspects, the one or more parameters include at least one of a signal-to-interference-plus-noise ratio, a reference signal received power, or a log likelihood ratio.

In a tenth aspect, alone or in combination with one or more of the first through ninth aspects, the threshold value is configured by the base station.

In an eleventh aspect, alone or in combination with one or more of the first through tenth aspects, the one or more RS transmissions comprise uplink SRS transmissions from the UE to the base station based at least in part on the downlink transmission relating to a low-latency service.

In a twelfth aspect, alone or in combination with one or more of the first through eleventh aspects, the base station determines the channel quality information based at least in part on the uplink SRS transmissions.

In a thirteenth aspect, alone or in combination with one or more of the first through twelfth aspects, the uplink SRS transmissions are used as the message to indicate that the downlink transmission was not received by the UE.

In a fourteenth aspect, alone or in combination with one or more of the first through thirteenth aspects, the one or more RS transmissions comprise downlink CSI-RS transmissions to the UE based at least in part on the downlink transmission relating to a service having a cycle duration that satisfies a threshold value.

In a fifteenth aspect, alone or in combination with one or more of the first through fourteenth aspects, the UE may receive the downlink CSI-RS transmissions from the base station and determine the channel quality information based at least in part on the downlink CSI-RS transmissions, and the base station may reschedule the downlink transmission on the component carrier in either the first frequency range or the second frequency range based at least in part on the report containing the channel quality information.

In a sixteenth aspect, alone or in combination with one or more of the first through fifteenth aspects, the downlink CSI-RS transmissions are scheduled on only a set of non-serving component carriers in the first frequency range based at least in part on the message transmitted to the base station including channel quality information relating to a serving component carrier in the first frequency range.

In a seventeenth aspect, alone or in combination with one or more of the first through sixteenth aspects, the first frequency range is a millimeter wave frequency range and the second frequency range is a sub-6 gigahertz frequency range.

In an eighteenth aspect, alone or in combination with one or more of the first through seventeenth aspects, process 1100 further includes receiving, from the base station, information indicating that a next occasion of the downlink transmission is scheduled in one or more subsequent cycles on the component carrier in either the first frequency range or the second frequency range based at least in part on the channel quality information determined from the one or more RS transmissions.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station, comprising:
   receiving, from a user equipment (UE), a message that indicates whether the UE received a downlink transmission via a physical downlink shared channel from the base station in a first frequency range;
   scheduling one or more reference signal (RS) transmissions in the first frequency range and one or more RS transmissions in a second frequency range based at least in part on the message received from the UE; and
   rescheduling the downlink transmission on a component carrier in either the first frequency range or the second frequency range based at least in part on channel quality information that is determined from the one or more RS transmissions in the first frequency range and the one or more RS transmissions in the second frequency range.

2. The method of claim 1, wherein the one or more RS transmissions in the first frequency range are transmitted in a beam sweep to enable the channel quality information to be determined for multiple candidate beams associated with one or more component carriers, including the component carrier, in the first frequency range.

3. The method of claim 2, further comprising:
receiving, from the UE, the one or more RS transmissions in the first frequency range in the beam sweep; and
determining the channel quality information for the multiple candidate beams associated with the one or more component carriers in the first frequency range based at least in part on the one or more RS transmissions received in the beam sweep.

4. The method of claim 2, further comprising transmitting the one or more RS transmissions in the first frequency range to the UE in the beam sweep to enable the UE to determine the channel quality information for the multiple candidate beams associated with the one or more component carriers in the first frequency range based at least in part on the one or more RS transmissions transmitted in the beam sweep.

5. The method of claim 1, wherein the one or more RS transmissions in the first frequency range and the one or more RS transmissions in the second frequency range are scheduled at different times.

6. The method of claim 1, wherein the message received from the UE is a negative acknowledgement to indicate that the downlink transmission was not received.

7. The method of claim 6, wherein the one or more RS transmissions in the first frequency range and the second frequency range are scheduled on preconfigured resources that are activated based on the negative acknowledgement.

8. The method of claim 6, wherein the one or more RS transmissions in the first frequency range and the second frequency range are scheduled on reserved resources that have a predefined offset from the negative acknowledgement.

9. The method of claim 1, wherein the message received from the UE is an acknowledgement to indicate that the downlink transmission was received on a serving component carrier with one or more parameters failing to satisfy a threshold value.

10. The method of claim 1, wherein the one or more RS transmissions comprise uplink sounding reference signal (SRS) transmissions from the UE to the base station based at least in part on the downlink transmission relating to a low-latency service.

11. The method of claim 1, wherein the one or more RS transmissions comprise downlink channel state information reference signal (CSI-RS) transmissions to the UE based at least in part on the downlink transmission relating to a service having a cycle duration that satisfies a threshold value.

12. The method of claim 11, wherein the UE determines the channel quality information based at least in part on the downlink CSI-RS transmissions, and wherein the method further comprises:
receiving, from the UE, a report containing the channel quality information; and
selecting the component carrier for rescheduling the downlink transmission based at least in part on the report containing the channel quality information.

13. The method of claim 11, wherein the downlink CSI-RS transmissions are scheduled on only a set of non-serving component carriers in the first frequency range based at least in part on the message received from the UE including channel quality information relating to a serving component carrier in the first frequency range.

14. The method of claim 1, further comprising:
scheduling a next occasion of the downlink transmission in one or more subsequent cycles on the component carrier in either the first frequency range or the second frequency range based at least in part on the channel quality information determined from the one or more RS transmissions.

15. A method of wireless communication performed by a user equipment (UE), comprising:
transmitting, to a base station, a message that indicates whether the UE received a downlink transmission via a physical downlink shared channel from the base station in a first frequency range;
receiving, from the base station, information related to one or more reference signal (RS) transmissions that are scheduled in the first frequency range and one or more RS transmissions that are scheduled in a second frequency range based at least in part on the message transmitted to the base station; and
receiving the downlink transmission on a component carrier in either the first frequency range or the second frequency range based at least in part on channel quality information that is determined from the one or more RS transmissions in the first frequency range and the one or more RS transmissions in the second frequency range.

16. The method of claim 15, wherein the one or more RS transmissions in the first frequency range are transmitted in a beam sweep to enable the channel quality information to be determined for multiple candidate beams associated with one or more component carriers, including the component carrier, in the first frequency range.

17. The method of claim 16, further comprising transmitting, to the base station, the one or more RS transmissions in the first frequency range in the beam sweep to enable the base station to determine the channel quality information for the multiple candidate beams associated with the one or more component carriers in the first frequency range.

18. The method of claim 16, further comprising:
receiving, from the base station, the one or more RS transmissions in the first frequency range in the beam sweep; and
determining the channel quality information for the multiple candidate beams associated with the one or more component carriers in the first frequency range based at least in part on the one or more RS transmissions received in the beam sweep.

19. The method of claim 15, wherein the one or more RS transmissions in the first frequency range and the one or more RS transmissions in the second frequency range are scheduled at different times.

20. The method of claim 15, wherein the message transmitted to the base station is a negative acknowledgement to indicate that the downlink transmission was not received.

21. The method of claim 20, wherein the one or more RS transmissions in the first frequency range and the second frequency range are scheduled on preconfigured resources that are activated based on the negative acknowledgement.

22. The method of claim 20, wherein the one or more RS transmissions in the first frequency range and the second frequency range are scheduled on reserved resources that have a predefined offset from the negative acknowledgement.

23. The method of claim 15, wherein the message transmitted to the base station is an acknowledgement to indicate that the downlink transmission was received on a serving component carrier with one or more parameters failing to satisfy a threshold value.

24. The method of claim 15, wherein the one or more RS transmissions comprise uplink sounding reference signal (SRS) transmissions from the UE to the base station based at least in part on the downlink transmission relating to a low-latency service.

25. The method of claim 15, wherein the one or more RS transmissions comprise downlink channel state information reference signal (CSI-RS) transmissions to the UE based at least in part on the downlink transmission relating to a service having a cycle duration that satisfies a threshold value.

26. The method of claim 25, further comprising:
receiving the downlink CSI-RS transmissions from the base station;
determining the channel quality information based at least in part on the downlink CSI-RS transmissions; and
transmitting, to the base station, a report containing the channel quality information, wherein the base station reschedules the downlink transmission on the component carrier in either the first frequency range or the second frequency range based at least in part on the report containing the channel quality information.

27. The method of claim 25, wherein the downlink CSI-RS transmissions are scheduled on only a set of non-serving component carriers in the first frequency range based at least in part on the message transmitted to the base station including channel quality information relating to a serving component carrier in the first frequency range.

28. The method of claim 15, further comprising:
receiving, from the base station, information indicating that a next occasion of the downlink transmission is scheduled in one or more subsequent cycles on the component carrier in either the first frequency range or the second frequency range based at least in part on the channel quality information determined from the one or more RS transmissions.

29. A base station, comprising:
one or more memories; and
one or more processors coupled to the one or more memories, configured to:
receive, from a user equipment (UE), a message that indicates whether the UE received a downlink transmission via a physical downlink shared channel from the base station in a first frequency range;
schedule one or more reference signal (RS) transmissions in the first frequency range and one or more RS transmissions in a second frequency range based at least in part on the message received from the UE; and
reschedule the downlink transmission on a component carrier in either the first frequency range or the second frequency range based at least in part on channel quality information that is determined from the one or more RS transmissions in the first frequency range and the one or more RS transmissions in the second frequency range.

30. A user equipment (UE), comprising:
one or more memories; and
one or more processors coupled to the one or more memories, configured to:
transmit, to a base station, a message that indicates whether the UE received a downlink transmission via a physical downlink shared channel from the base station in a first frequency range;
receive, from the base station, information related to one or more reference signal (RS) transmissions that are scheduled in the first frequency range and one or more RS transmissions that are scheduled in a second frequency range based at least in part on the message transmitted to the base station; and
receive the downlink transmission on a component carrier in either the first frequency range or the second frequency range based at least in part on channel quality information that is determined from the one or more RS transmissions in the first frequency range and the one or more RS transmissions in the second frequency range.

* * * * *